US012338040B2

(12) United States Patent
Markman

(10) Patent No.: US 12,338,040 B2
(45) Date of Patent: Jun. 24, 2025

(54) MULTI-FUNCTION WIPE CONTAINER WITH INTEGRATED KNIFE OR STRAIGHTEDGE CLEANING LID

(71) Applicant: Austin Markman, Georgetown, TX (US)

(72) Inventor: Austin Markman, Georgetown, TX (US)

( * ) Notice: Subject to any disclaimer, the term of this patent is extended or adjusted under 35 U.S.C. 154(b) by 76 days.

(21) Appl. No.: 18/229,129

(22) Filed: Aug. 1, 2023

(65) Prior Publication Data

US 2025/0042603 A1 Feb. 6, 2025

(51) Int. Cl.

| | |
|---|---|
| ***A47L 21/00*** | (2006.01) |
| ***A47K 10/32*** | (2006.01) |
| ***A47L 17/00*** | (2006.01) |
| ***B08B 1/14*** | (2024.01) |
| ***B65D 5/72*** | (2006.01) |
| ***B65D 83/08*** | (2006.01) |
| *A47L 21/04* | (2006.01) |

(52) U.S. Cl.

CPC .............. *B65D 5/727* (2013.01); *B08B 1/143* (2024.01); *A47K 10/32* (2013.01); *A47K 2010/3266* (2013.01); *A47L 21/00* (2013.01); *A47L 21/04* (2013.01)

(58) Field of Classification Search

CPC .. A47K 10/421; A47K 10/426; A47K 10/185; A47K 2010/3266; A47K 2010/3233; A47L 1/15; A47L 13/26; A47L 21/00; A47L 21/04; A47L 21/06; A47L 13/16; A47L 17/00; B08B 1/14; B08B 1/143; B65D 5/727; B65D 83/0805; B65D 2543/00398; B65H 35/0046; G01F 23/045

USPC ............... 15/218.1, 218; 220/260; 242/588.3

See application file for complete search history.

(56) References Cited

U.S. PATENT DOCUMENTS

| | | | | | |
|---|---|---|---|---|---|
| 239,500 | A * | 3/1881 | Howe | A47L 21/00 | 15/218.1 |
| 249,465 | A * | 11/1881 | Ferguson | A47L 21/00 | 15/218.1 |
| 360,174 | A * | 3/1887 | Riley | A47L 21/00 | 15/218.1 |
| 487,446 | A * | 12/1892 | Murphy | A47L 21/00 | 15/210.1 |
| 619,378 | A * | 2/1899 | Whittenham | A47L 21/00 | 15/218.1 |
| 683,094 | A | 9/1901 | Woodley | | |
| 739,807 | A * | 9/1903 | Appleton | A47L 21/00 | 15/218.1 |

(Continued)

FOREIGN PATENT DOCUMENTS

| | | |
|---|---|---|
| JP | 5246444 | 7/2013 |
| WO | 2019/109064 | 6/2019 |

*Primary Examiner* — Gideon R Weinerth

(74) *Attorney, Agent, or Firm* — The Buche Law Firm, P.C.; Bryce A. Johnson; John K. Buche

(57) ABSTRACT

The present disclosure relates to a novel and innovative knife cleaning solution or system. The disclosed system pertains to a specialized lid designed for wipes' containers, specifically catering to the needs of chefs and home cooks for safe and on-the-spot knife cleaning. The lid offers a unique and versatile layout, enabling efficient knife cleaning while also containing the waste generated during the process. Additionally, the lid is adaptable and can be used with various types of wipes packaging, enhancing its usability and convenience.

18 Claims, 17 Drawing Sheets

(56) References Cited

U.S. PATENT DOCUMENTS 836,189 A * 11/1906 Hutchinson ............. A47L 21/00 24/457
959,803 A * 5/1910 Ernst ....................... A47L 21/00 15/218.1
977,680 A * 12/1910 Robinson ................ A47L 21/00 15/218.1
1,131,374 A 1/1915 Haywood
1,178,099 A 4/1916 Prenosil
1,219,993 A * 3/1917 Bunnosuke ............. A47L 21/00 15/210.1
1,478,835 A 2/1919 Peacock et al.
1,349,123 A * 8/1920 Erikson ................ B24D 15/088 15/218.1
2,140,209 A 12/1938 Rietveld
2,342,454 A 2/1944 Coyliondro
2,499,416 A 3/1950 Reid et al.
2,609,985 A 9/1952 Reid et al.
2,688,422 A 9/1954 Eisenberg
2,698,450 A 1/1955 Mack
2,705,334 A 4/1955 Farrow
2,707,299 A 5/1955 Steindorf et al.
2,719,313 A * 10/1955 Smith ...................... A47L 21/04 15/118
2,737,149 A * 3/1956 Collins, Jr. ............. B60R 22/38 118/235
2,777,142 A 1/1957 Verde
2,789,301 A 1/1957 Harvey
2,941,692 A 6/1960 Kappel
3,002,668 A * 10/1961 Castelli .................. A47K 10/34 221/63
3,094,730 A * 6/1963 Schwarz ................. A47L 21/00 D7/669
3,395,828 A 8/1968 Schnabel
3,592,161 A * 7/1971 Hoffmann .............. A47K 10/38 118/43
3,756,483 A * 9/1973 Schraeder .............. A47K 10/32 225/52
3,899,107 A 8/1975 Gaal
3,982,659 A 9/1976 Ross
4,112,536 A * 9/1978 Carson, Jr. ............. A47K 10/28 400/208
4,126,962 A 11/1978 Polcaro
4,185,754 A 1/1980 Jilius
4,275,970 A 6/1981 Morrison et al.
4,374,445 A * 2/1983 Wilson .................. G01F 23/045 15/218.1
4,566,606 A * 1/1986 Kling ................. B65D 83/0847 401/196
5,040,680 A 8/1991 Wilson et al.
5,085,317 A 2/1992 Jensen et al.
5,134,957 A * 8/1992 Nobili ................ A45D 40/0087 118/235
5,337,911 A 8/1994 Holub
5,404,611 A 4/1995 Raney
5,516,291 A 5/1996 Miyake
5,652,993 A * 8/1997 Kreyer ................... A46B 11/00 15/160
5,699,912 A 12/1997 Ishikawa et al.
D414,637 S 10/1999 Amundson et al.
6,092,690 A 7/2000 Bitowft et al.
6,102,235 A 8/2000 Stern et al.
6,158,614 A * 12/2000 Haines ............... A47K 10/3818 221/33
6,394,298 B1 5/2002 Zaidman
6,786,447 B2 * 9/2004 Geib .................. A47K 10/3818 242/588.3
6,836,920 B1 1/2005 Scannell
6,951,292 B2 10/2005 Bando et al.
D545,097 S 6/2007 Schlaupitz et al.
8,291,952 B2 10/2012 Robellard et al.
8,871,029 B1 10/2014 Leslie
8,893,911 B2 11/2014 Damaghi et al.
8,966,702 B1 * 3/2015 Green ..................... A47L 17/00 15/229.11
9,352,475 B2 5/2016 Nasrallah
9,452,508 B2 9/2016 Beechinor et al.
9,630,765 B1 4/2017 Nelson
10,053,283 B1 * 8/2018 Stravitz ............... B65B 67/1211
D828,717 S 9/2018 Zhang
10,334,998 B2 7/2019 Rubo et al.
D856,619 S 8/2019 Mitford
D878,202 S 3/2020 Benishai
D884,473 S 5/2020 Tse et al.
D896,647 S 9/2020 Dai
D959,781 S 8/2022 Wen et al.
D967,706 S 10/2022 Dern et al.
11,458,510 B2 * 10/2022 Perez ........................ B08B 1/20
11,590,739 B2 2/2023 Casey
2004/0074936 A1 4/2004 McDonald
2005/0039293 A1 2/2005 McReynolds et al.
2005/0236465 A1 10/2005 Stevens
2006/0054517 A1 3/2006 Albert
2008/0099596 A1 5/2008 DeMaso et al.
2008/0179326 A1 7/2008 Krauth et al.
2009/0159607 A1 6/2009 Kratzer
2010/0122985 A1 5/2010 Peters et al.
2010/0307008 A1 12/2010 Zeitlin
2011/0101019 A1 * 5/2011 Maurice ............. B65D 83/0882 221/30
2014/0231297 A1 * 8/2014 Berger ................. A47K 10/421 220/200
2014/0305942 A1 * 10/2014 Van Goolen ......... B65D 43/161 220/260
2021/0276049 A1 * 9/2021 Perez .................. B26B 21/4075
2022/0183536 A1 * 6/2022 Willeford .................. B26B 3/00
2023/0008750 A1 1/2023 Salicrup
2023/0150724 A1 5/2023 Perry et al.
2024/0306861 A1 * 9/2024 Brascom ............ B65D 83/0805

* cited by examiner

MULTI-FUNCTION WIPE CONTAINER WITH INTEGRATED KNIFE OR STRAIGHTEDGE CLEANING LID

CROSS-REFERENCE TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

REFERENCE TO AN APPENDIX SUBMITTED ON A COMPACT DISC AND INCORPORATED BY REFERENCE OF THE MATERIAL ON THE COMPACT DISC

Not applicable.

STATEMENT REGARDING PRIOR DISCLOSURES BY THE INVENTOR OR A JOINT INVENTOR

A product embodying the disclosed invention was trademarked SANIKNIVES and first used as early as June 2023 before being introduced to commerce of the United States at least as early as Jun. 29, 2023. This prior public disclosure is identified in U.S. Trademark application Ser. No. 98/077,251 for SANIKNIVES. Hereinafter the invention may be referred to as SANIKNIVES™.

BACKGROUND OF THE INVENTION

Field of Invention

The disclosed subject matter is in the field of systems and apparatus for cleaning straight edges or knives.

Background of the Invention

Knives and straight edges are common tools in the culinary world. Thus, the efficient and safe cleaning of knives and other straight-edge cutting or cooking tools is of utmost importance to maintain hygiene and prevent cross-contamination of foods or flavors during food preparation. Chefs and home cooks often encounter the challenge of needing to quickly clean their knives and on the spot between different food cuts. The goal of cleaning a knife on the spot is ensuring that no residual flavors or contaminants from prior cuts remain on the blade. The conventional methods of cleaning knives using sinks and washcloths are most often inconvenient, time-consuming, and may not guarantee complete sanitation.

Traditional knife-cleaning techniques or systems also present safety hazards because the process of wiping the blade on a cloth or using the fingers to clean the blade exposes users to the risk of cuts and injuries. Moreover, the waste and debris cleaned off the knife during these procedures are often left uncontained, leading to potential contamination of the surrounding workspace and the knife itself.

SUMMARY OF THE INVENTION

To address these challenges and enhance the safety and efficiency of knife cleaning, the disclosed SANIKNIVES™ system, apparatus, and related methods have been proposed. Suitably, SANIKNIVES™ is a multi-function wipe container with an integrated knife or straight-edge cleaning lid that improves the state of the art as to the way knives are cleaned in both professional kitchens and home settings.

An objective of SANIKNIVES™ disclosure is to provide chefs and cooks with a quick, on-the-spot, and safe method for cleaning knives between different food cuts. By combining a wipe container with a specially designed lid, SANIKNIVES™ eliminates the need for traditional cleaning methods and mitigates the risk of injuries associated with handling knives directly.

The layout of the SANIKNIVES™ lid is a key to the proposed lid's functionality. The lid features an annular base that attaches securely to the top rim of the wipe container, enabling easy access to the wipes. A cover plate is hingedly connected to the base, providing a protective seal to close the container and safeguard the wipes from moisture, moisture-loss, and contaminants. Additionally, a cleaning plate is integrated into the cover plate, creating a convenient and safe platform for cleaning knives.

During use, the cover plate may be opened via a user-friendly tab, revealing the annulus of the annular base, from which individual wipes can be dispensed. The cover plate is equipped with an annular projection and a latch that respectively interact with an annulus and catch of the base, ensuring a secure closure to preserve wipe freshness.

The cleaning plate is strategically positioned to open in a transverse direction relative to the cover plate, allowing the user to secure a wipe over the cover and cleaning plates via biting the wipe between teeth and a tab of the cleaning plate. With the tab securely hinged to the teeth to accomplish the biting action, the wipe is held in place, creating a safe and effective platform for cleaning knives or straight edges. By placing a knife on the wipe so that the knife is held by the cover plate and closing the cleaning plate over the wipe and cover plate, the knife or straight edge will be sandwiched between the cleaning plate and cover plate such that the user can pull the knife through the wipe to wipe off any waste or debris, effectively containing the contaminants of the blade within the wipe and preventing cross-contamination. The process ensures that the knife remains sanitary and ready for the next cut, enhancing efficiency and food safety.

SANIKNIVES™ addresses the critical need for safe, quick, and on-the-spot knife cleaning in culinary or other settings. By integrating a wipe container with a specialized cleaning lid, SANIKNIVES™ offers a hygienic solution that effectively contains the waste wiped off the knife while preventing the cross-contamination of foods. This innovation represents a significant advancement in kitchen hygiene and safety for the benefit of both professional chefs and home cooks alike.

Some of the features of the disclosed technology include:

Dual-Hinged Lid:

SANIKNIVES™ features a unique dual-hinged lid that serves multiple purposes. Firstly, SANIKNIVES™ facilitates easy dispensing of sanitation wipes, ensuring quick access to a clean wipe for knife cleaning. Secondly, the lid provides finger protection during use, safeguarding users from potential cuts or injuries while handling sharp objects.

Portable and Disposable Design:

SANIKNIVES™ is laid-out for portability, making SANIKNIVES™ an ideal companion for chefs and home cooks alike. SANIKNIVES™'s disposable nature ensures a fresh and sanitary cleaning experience every time, eliminating the need for cumbersome and potentially unhygienic reusable knife cleaning solutions.

Built-In Cut Guard:

The apparatus incorporates a sharp guard within the lid's second compartment, creating a safe enclosure for knives during sanitation. This guard prevents accidental contact with the knife's edge and mitigates the risk of injury while storing or disposing of used wipes.

Versatility:

SANIKNIVES™'s layout allows it to accommodate a wide range of sharp objects, not limited to knives alone. It can effectively sanitize other sharp tools, such as scissors, box cutters, and utility knives, making it a versatile solution for various applications.

Efficient Wipe Dispensing:

The apparatus ensures efficient and controlled wipe dispensing, reducing wastage and optimizing the usage of sanitation wipes, thereby extending their lifespan.

DESCRIPTION OF PRIOR ART

Prior art knife cleaning methods and multi-use wipe dispensers faced various challenges that compromised efficiency and hygiene in culinary settings.

Knife Cleaning Prior Art: Various knife cleaning methods have been used in the past, such as wiping the blade on a cloth or using fingers, which posed safety risks due to the direct handling of sharp blades. U.S. Pat. No. 2,140,209 (issued 1938) by Rietveld disclosed a "knife blade cleaner," but it did not employ wipes and lacked a comprehensive solution for efficient knife cleaning. Similarly, U.S. Pat. No. 2,707,299 (issued 1955) by Steindorf et al. disclosed "spatula cleaners," which slid knives between two surfaces, but did not offer a mechanism for containing the waste. The prior art lacked a dedicated and efficient knife-cleaning tool, leaving chefs and home cooks susceptible to cross-contamination and time-consuming cleaning processes.

Multi-Use Wipe Dispenser Prior Art: Certain multi-use wipe dispensers, such as U.S. Pat. No. 6,836,920 (issued 2005) by Scannell, offered a "plastic pop-top can lip cleaner" with a package of cleaning wipes. However, it was not designed specifically for knife cleaning, and the wipes did not efficiently contain the waste from the can's lip. Additionally, U.S. Pat. No. 9,630,765 (issued 2017) by Nelson disclosed a "combination deodorant/antiperspirant and moist wipes container," but it did not address the unique requirements of knife cleaning. The generic multi-use wipe dispensers lacked the necessary features to ensure a comprehensive and sanitary knife cleaning process.

State of the art: The prior art demonstrates a need for a safe, fast, and on-the-spot knife cleaning method that would prevent cross-contamination between different food cuts while ensuring user safety. Traditional cleaning methods posed risks of injury and were time-consuming, while generic multi-use wipe dispensers lacked the necessary functionalities for efficient and effective knife or straight edge cleaning.

Improvement: SANIKNIVES™ offers an innovative and practical solution to the problems presented by the prior art. SANIKNIVES™ is a multi-function wipe container with an integrated knife-cleaning lid, designed to revolutionize knife cleaning practices and enhance kitchen hygiene.

A feature of SANIKNIVES™ is a specialized lid, which addresses the shortcomings of traditional knife cleaning methods and generic multi-use wipe dispensers. The annular base of the lid securely attaches to the wipe container, allowing easy access to individual wipes for convenient use. The cover plate, hingedly connected to the base, provides a protective seal to safeguard the wipes from moisture and contaminants, ensuring their freshness and effectiveness.

The cleaning plate, integrated into the cover plate, serves as a dedicated platform for knife cleaning. The transverse opening and user-friendly tab on the cleaning plate enable safe and quick access to wipe the knife blade effectively. By sandwiching the knife between the cleaning plate and cover plate and using the wipe, the waste and debris from the knife are effectively contained within the wipe. This prevents cross-contamination and ensures that the knife remains sanitary and ready for the next use.

SANIKNIVES™ confronts the limitations of the prior art by providing a specialized, multi-use wipe dispenser with a knife-cleaning lid. SANIKNIVES™ offers a fast, safe, and on-the-spot knife cleaning solution, promoting kitchen hygiene and food safety in both professional and home culinary environments. SANIKNIVES™'s unique layout sets it apart from traditional knife cleaning methods and generic multi-use wipe dispensers, making it a highly efficient and essential tool for chefs and cooks worldwide.

BRIEF DESCRIPTION OF THE SEVERAL VIEWS OF THE DRAWINGS

Other objectives of the disclosure will become apparent to those skilled in the art once the invention has been shown and described. The way these objectives and other desirable characteristics can be obtained is explained in the following description and attached figures in which.

Figure 1A:
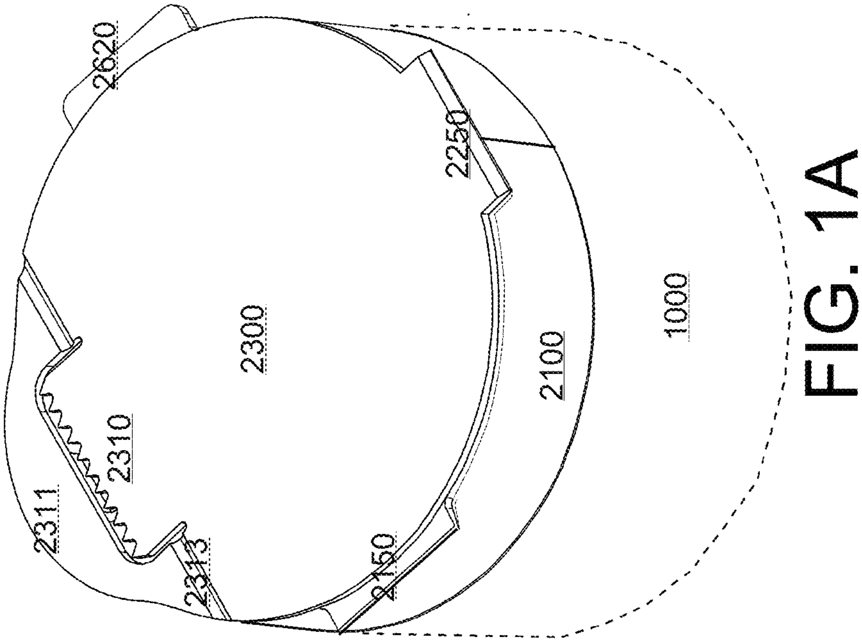
FIG. 1A—Perspective view of wipes' container 1000 with a straightedge-cleaning lid 2000.

In the figures, the following reference numerals represent the corresponding component of the disclosed technology.

- 1000—Wipes' container
  - 1100—Top rim of the wipes' container
- 2000—Straightedge-cleaning lid
  - 2100—Annular base of the lid
    - 2110—Annulus of the annular base
    - 2120—Catch on the rim of the annular base
    - 2150—Hinge connecting the base and cover plate
  - 2200—Cover plate of the lid
    - 2210—Annular projection on the lower surface of the cover plate
    - 2220—Latch on the lower surface of the cover plate
    - 2230—Catches on the upper surface of the cover plate
    - 2240—Outer ovular projections on the upper surface of the cover plate
    - 2250—Hinge connecting the cover plate and cleaning plate
    - 2260—Tab for gripping the cover plate
    - 2270—catch surface
  - 2300—Cleaning plate of the lid
    - 2310—Mouth on the cleaning plate
      - 2311—Teeth on the mouth of the cleaning plate
      - 2312—Tab for gripping the cleaning plate
      - 2313—Hinge connecting the tab and teeth on the mouth
      - 2314—latch for mouth that catches the catch surface of the cover plate.
    - 2320—Latches on the lower surface of the cleaning plate
    - 2330—Inner ovular projections on the lower surface of the cleaning plate
- 3000—Wipes
- 4000—User
- 5000—Knife or straight edge to be cleaned It is to be noted, however, that the appended figures illustrate only typical embodiments of this invention and are therefore not to be considered limiting of its scope, for the invention may admit to other equally effective embodiments that will be appreciated by those reasonably skilled in the relevant arts. Also, figures are not necessarily made to scale but are representative.

DETAILED DESCRIPTION OF PREFERRED EMBODIMENTS

Disclosed is a quick, on-the-spot, and safe method for cleaning knives between different food cuts. By combining a wipe container with a specially designed lid, the need for traditional cleaning methods is eliminated and the risk of injuries associated with handling knives directly may be mitigated. The layout of a lid for a wipes container or packaging is a key to the proposed lid's functionality. The lid suitably features an annular base that attaches securely to the top rim of the wipe container, enabling easy access to the wipes. A cover plate is hingedly connected to the base, providing a protective seal to close the container and safeguard the wipes from moisture, moisture-loss, and contaminants. Additionally, a cleaning plate is integrated into the cover plate, creating a convenient and safe platform for cleaning knives. The more specific details and utilities of the disclosure are described with reference to the attached figures.

FIG. 1A presents a perspective view of the lid 2000 and associated container 1000 of wipes. The assembled lid 2000 and container 1000 present an innovative all-in-one knife or straightedge sanitation solution. The assembly consists of two main components: a wipes' container 1000 and a straightedge-cleaning lid 2000. The container 1000 features a tubular design, while the lid 2000 takes the form of a circular disk. The lid 2000 is ingeniously folded via two hinges and comprises the following elements:

Annular Base (2100): The annular base securely attaches to the top rim 1100 of the wipes' container 1000. This attachment enables the controlled dispensing of individual wipes through the annulus of the base 2100.

Cover Plate (2200): The cover plate 2200 is hingedly connected to the annular base 2100. The plate 2200 serves as a protective cover, concealing the annulus of the base 2100 when closed, thereby safeguarding the wipes disposed within the container 1000.

Cleaning Plate (2300): The cleaning plate 2300 is also hingedly connected, but to the cover plate 2200. The plate 2300 cooperates with the cover plate to create opposing surfaces for knife wiping and sanitation.

Figure 1C:
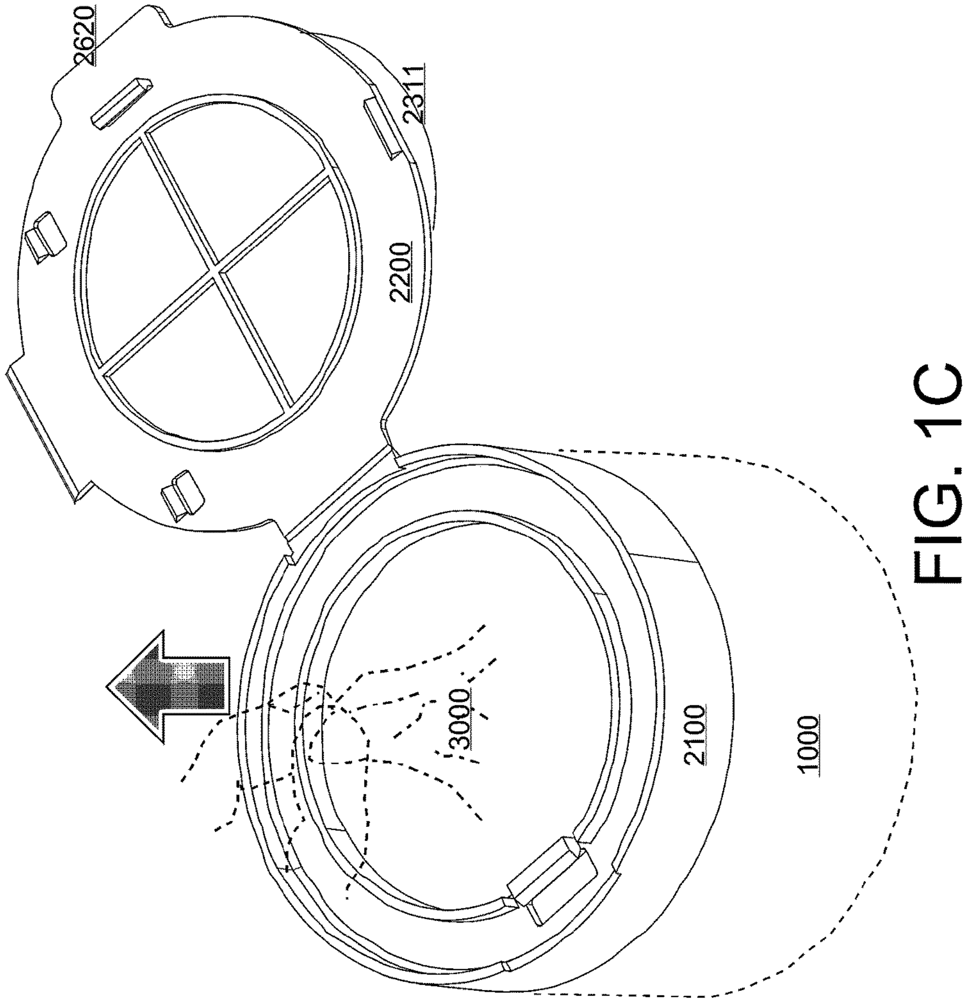
FIG. 1C—Perspective view of the wipes' container 1000 with the straightedge-cleaning lid 2000 wherein the cover plate 2200 is in an open configuration relative to the base.
Figure 1B:
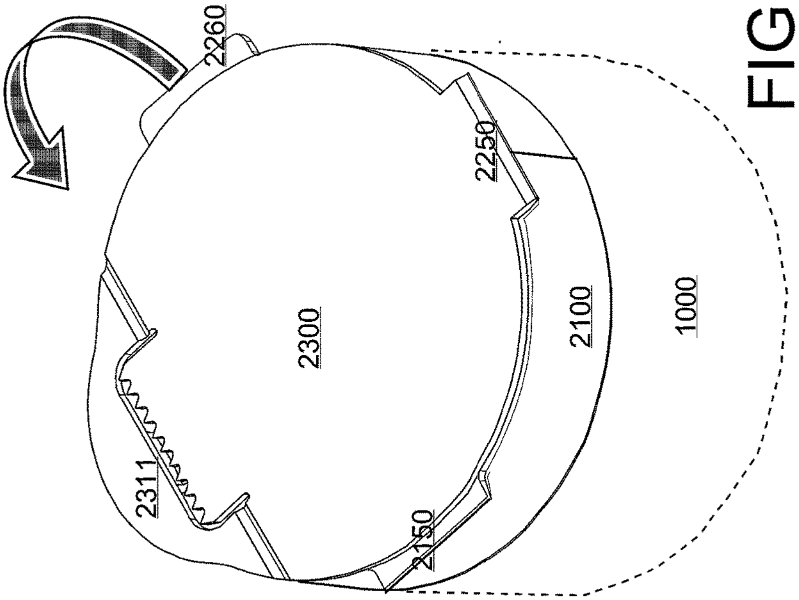
FIG. 1B—Another perspective view of the wipes' container 1000 with the straightedge-cleaning lid 2000 in a closed configuration relative to the base.
Figure 1E:
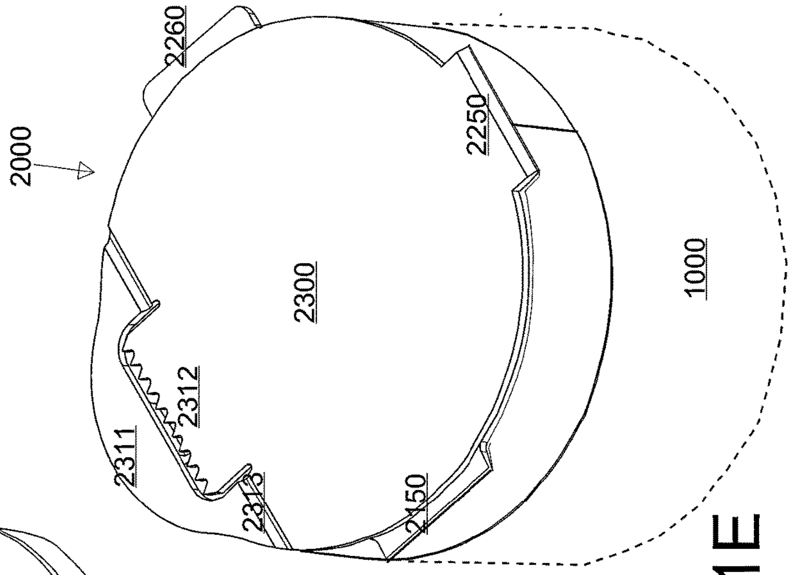
FIG. 1E—Another perspective view of the wipes' container 1000 with the straightedge-cleaning lid 2000 in a closed configuration relative to the base.

FIGS. 1B & 1E depict the container 1000 and lid 2000 in a Closed Configuration. In these perspectives, the lid 2000 is particularly depicted in a closed configuration. The straightedge-cleaning lid 2000 securely encloses the wipes' container 1000, providing comprehensive protection for the wipes and preventing any potential leakage of moisture or air. FIG. 1B demonstrates the opening direction indicated by an arrow, and in the opposite direction (FIG. 1D), the lid closes over the annulus of the base 2100 when the latch and catch components associate with each other.

Figure 1D:
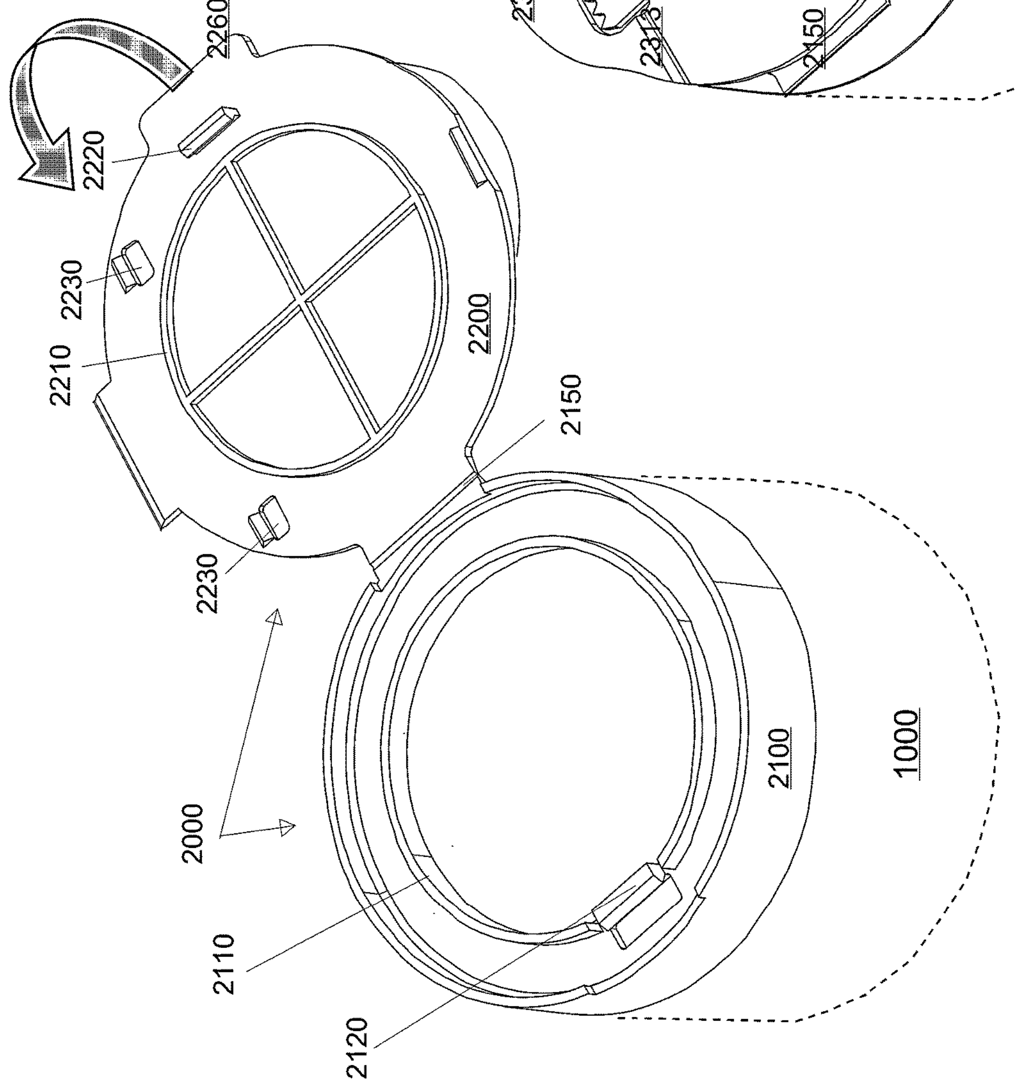
FIG. 1D—Perspective view of the wipes' container 1000 with the straightedge-cleaning lid 2000 wherein the cover plate 2200 is in an open configuration relative to the base.

FIGS. 1C & 1D depict the lid 2000 in an Open Configuration. In these perspectives, the cover plate 2200 is in an open configuration relative to the base 2100. The annulus 2110 of the annular base 2100 is exposed, allowing for easy and controlled dispensing of sanitation wipes 3000 through the annulus 2110. The lower surface of the cover plate 2200 features an annular projection 2210, which effectively interfaces with the annulus 2110, ensuring a moisture and airtight seal to protect the wipes 3000 within the container.

Additionally shown in FIGS. 1C & D is that the lower surface of the cover plate 2200 is equipped with a latch 2220, which corresponds to a catch 2120 on the rim of the annular base 2100. This latch 2220 and catch 2120 mechanism ensures a secure closure of the lid 2000 until disconnected. Furthermore, a user-friendly tab 2260 provides a comfortable grip on the cover plate 2200, allowing users to apply force and hinge the cover plate around the cover plate-to-base hinge (2150). This interaction enables the easy opening of the container 1000 (arrow in FIG. 1B) for access to the wipes. When the tab is interacted with in the opposite direction (arrow in FIG. 1D), the lid closes over the annulus of the base when the latch and catch associate with one another.

Figure 2B:
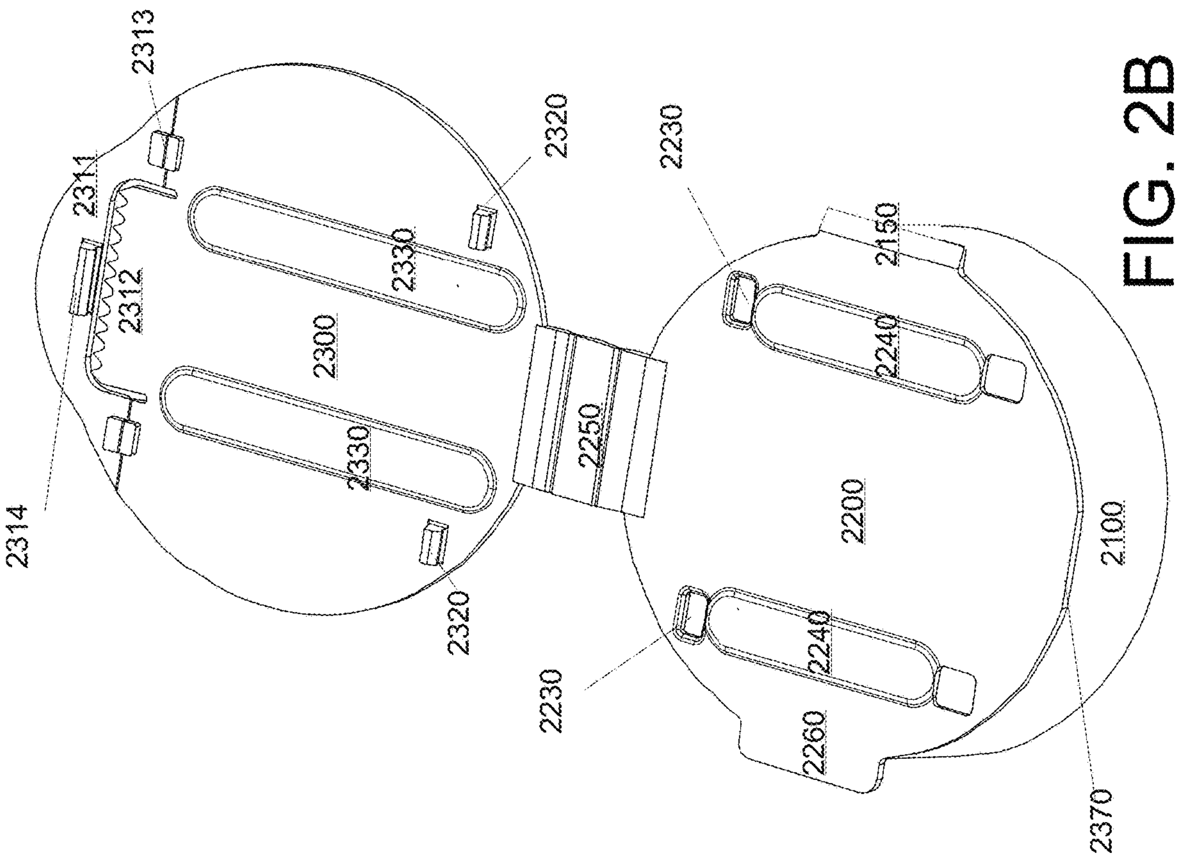
FIG. 2B—Perspective view of the wipes' container 1000 with the straightedge-cleaning lid 2000 wherein the cleaning plate 2300 is in an open configuration relative to the cover plate 2200.
Figure 2A:
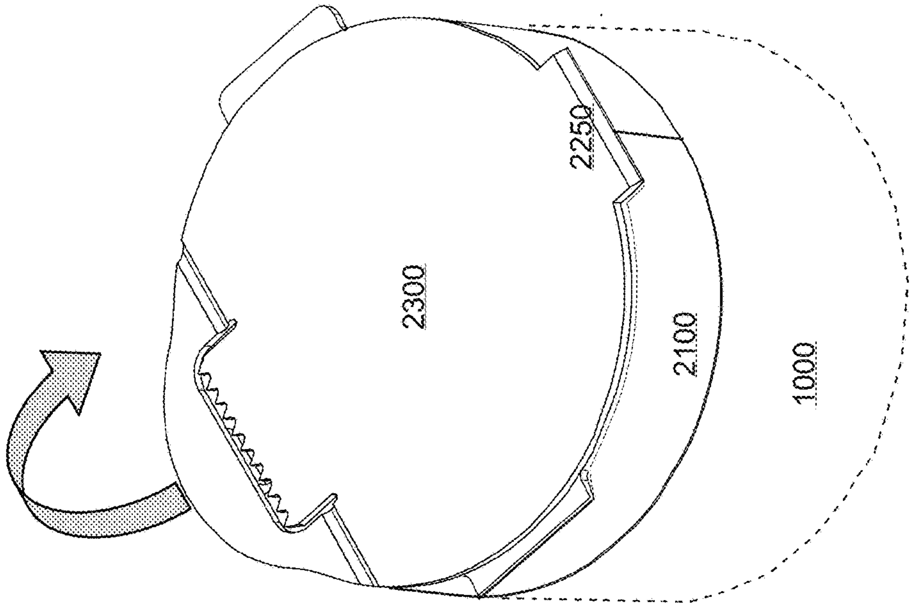
FIG. 2A—Another perspective view of the wipes' container 1000 with the straightedge-cleaning lid 2000 in a closed configuration relative to the base.

FIG. 2A is a perspective view of the lid 2000 in a closed configuration. FIG. 2B is a perspective view of the lid 2000 with the cleaning plate 2300 in an open configuration. In FIG. 2A, the straightedge-cleaning lid 2000 is in a closed configuration relative to the base 1000. The lid 2000 securely encloses the wipes' container, providing comprehensive protection and sanitation for the wipes within. In FIG. 2B, the cleaning plate 2300 is shown in an open configuration relative to the cover plate 2200. In this view, the top surface of the cover plate 2200 is exposed, as is the bottom surface of the cleaning plate 2300. Suitably, the top surface of the cover plate 2200 exhibits a series of outer ovular projections 2240, which are parallelly positioned along a secant or chord of the circular disk's top surface. Similarly, the bottom surface of the cleaning plate 2300 features inner ovular projections 2330, arranged parallelly along a different secant or chord of the circular disk that is the cleaning plate's 2300 bottom surface. These projections 2330/2240 play a role in facilitating a secure closure of the lid 2000 when not in use because the inner ovular projections 2330 sit between the outer projections 2240 of the cleaning plate. Moreover, the lower surface of the cleaning plate 2300 boasts two latches 2320, designed to interlock with corresponding catches 2230 on the top surface of the cover plate 2200. This locking mechanism ensures that the cleaning plate 2300 remains closed until the latches 2320 and catches 2230 are disconnected, providing a firm seal to keep the wipes' container streamline.

As shown in FIGS. 2A and 2B, a user-friendly tab 2312 is thoughtfully provided, allowing for a comfortable grip on the cleaning plate 2300. This tab 2312 permits users to apply force and effortlessly hinge the cleaning plate around the cleaning plate-to-cover plate hinge 2250. By interacting with the tab 2312 as indicated by the arrow in FIG. 2A, users can conveniently open the straightedge cleaning lid 2000 and access the wipes 3000 and the cleaning plate 2300 for knife sanitation. Conversely, when the tab is interacted with in the opposite direction (not shown), the cleaning plate 2300 closes over the cover plate 2200, ensuring a streamline container whenever the latches 2320 and catches 2230 associate with each other. This situation guarantees that the container 1000 remains compact and portable during transportation, suitable for use in professional and home kitchens alike.

Figure 3:
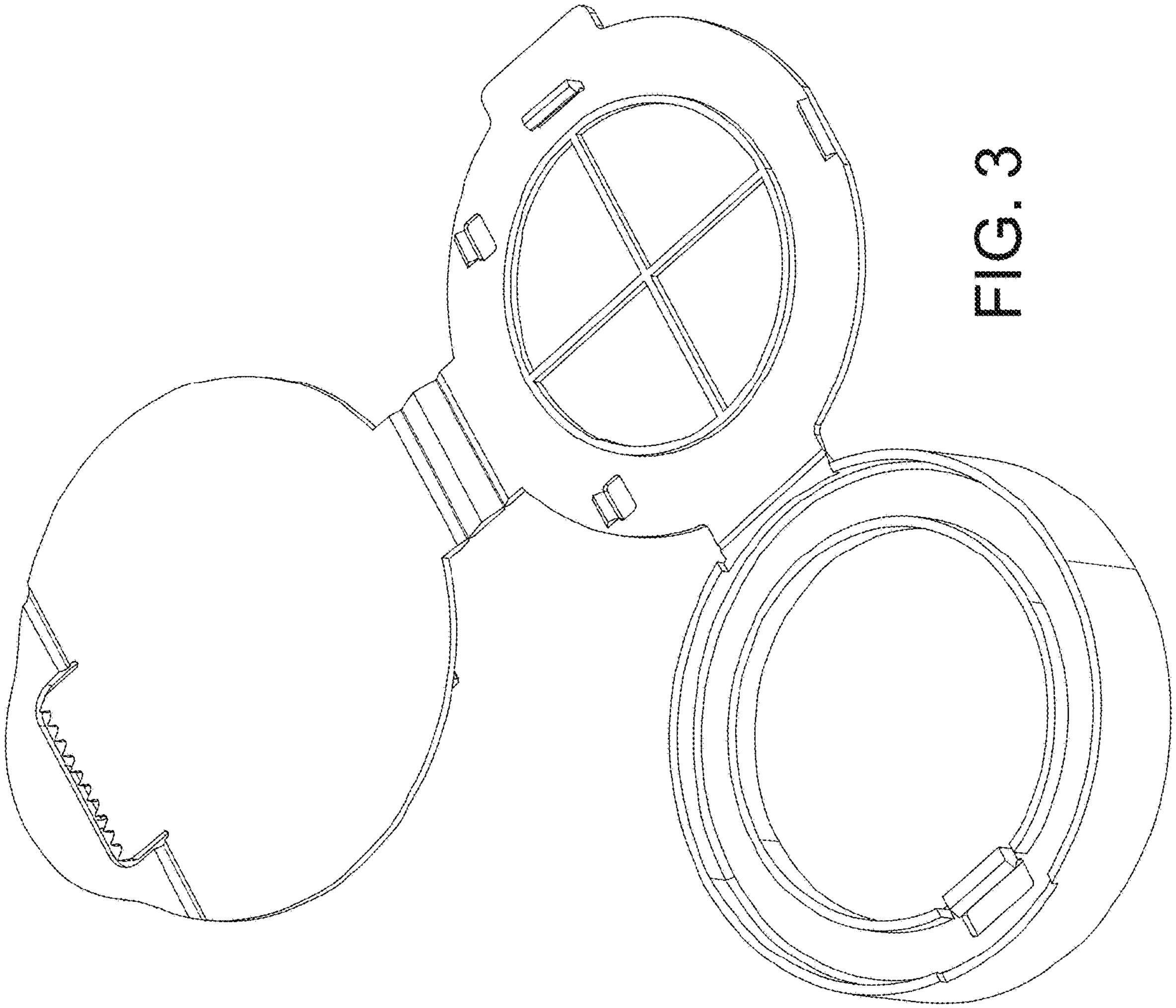
FIG. 3—Top perspective view of the lid 2000 in an open configuration of the cover plate and open configuration of the cleaning plate.
Figure 4:
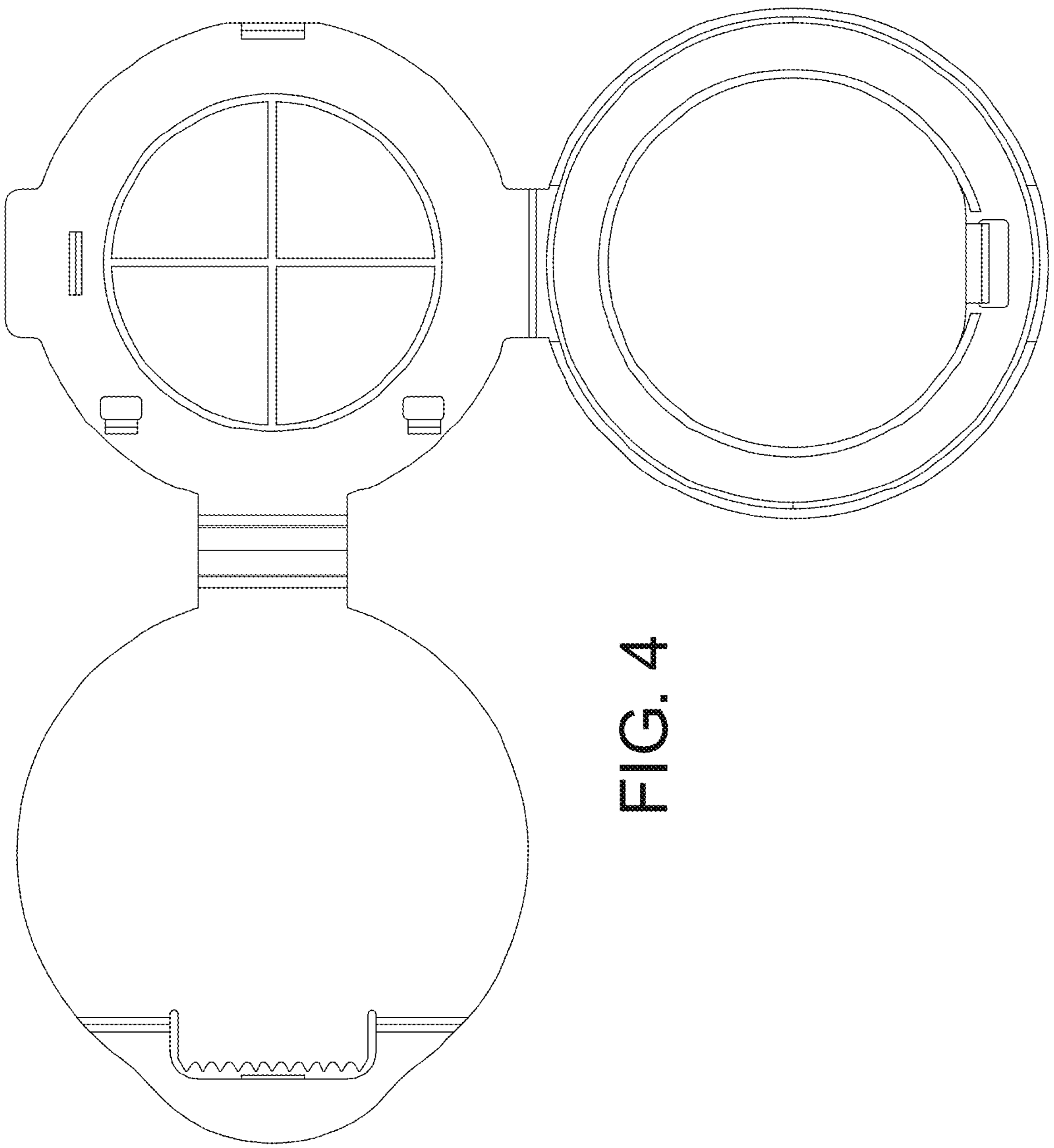
FIG. 4—Top plan view of the lid 2000 in an open configuration of the cover plate and open configuration of the cleaning plate.

FIG. 3 provides a top perspective view of the lid 2000 in completely unfolded configuration. The cover plate 2200 and cleaning plate 2300 are both open, revealing their respective surfaces. FIG. 4 presents a top plan view of the lid shown in FIG. 3. This view showcases the top surface of the cleaning plate 2300, the bottom surface of the cover plate 2200 with the annular projection 2210, and latch 2220, as well as the annulus 2110 of the base 2100 and the catch 2120. These elements collectively contribute to the functionality and effectiveness of the lid, ensuring secure closure, effective sanitation, and protection of the wipes during use and transportation. Through these figures, the images demonstrate a superior layout, ease of use, and exceptional utility as a portable and efficient all-in-one knife sanitation solution. Its compatibility with various packaging styles, as represented in the reference numerals and components, reinforces its versatility and potential in the culinary industry.

Figure 5:
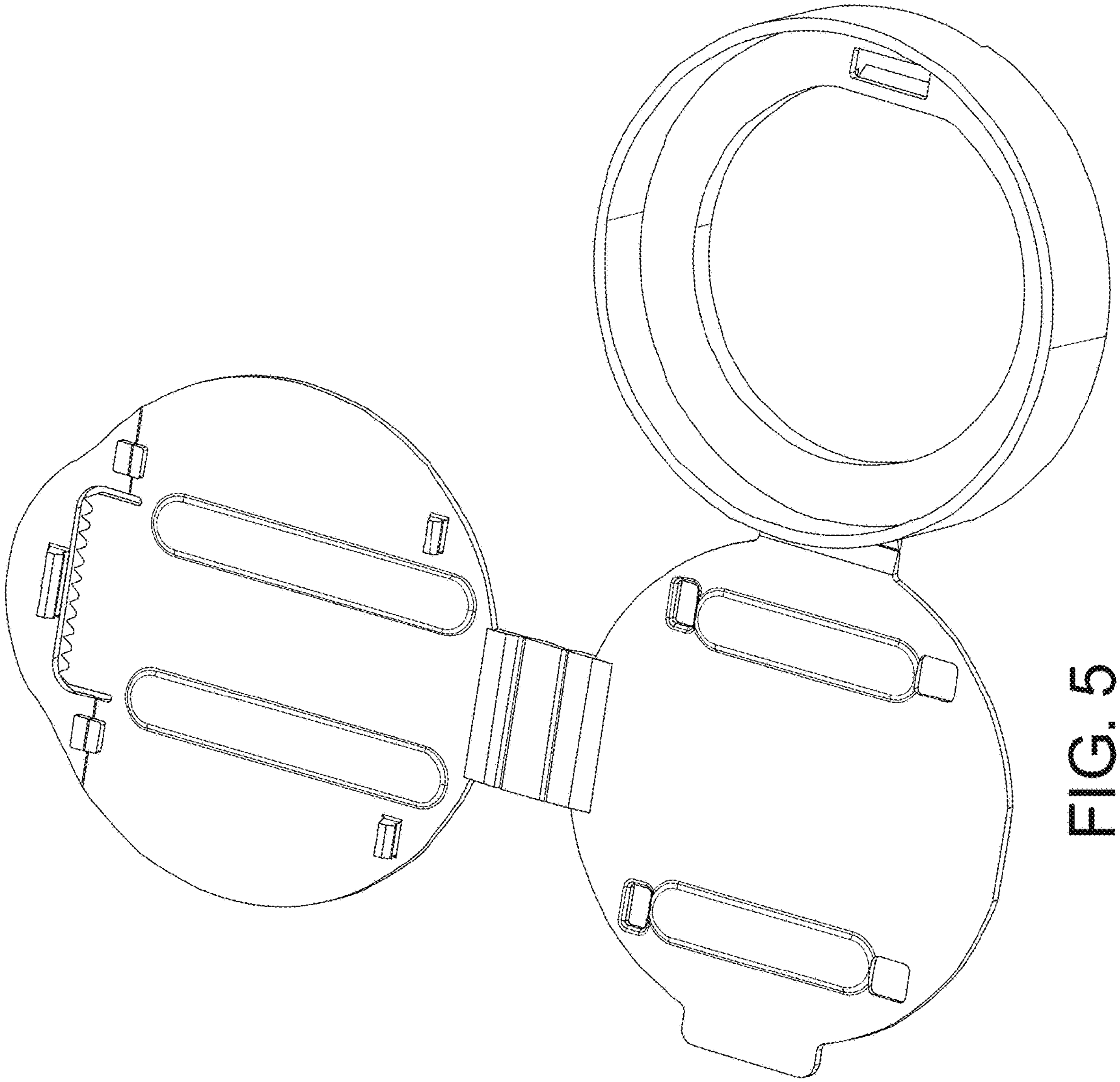
FIG. 5—Bottom perspective view of the cover plate in an open configuration and cleaning plate in an open configuration.
Figure 6:
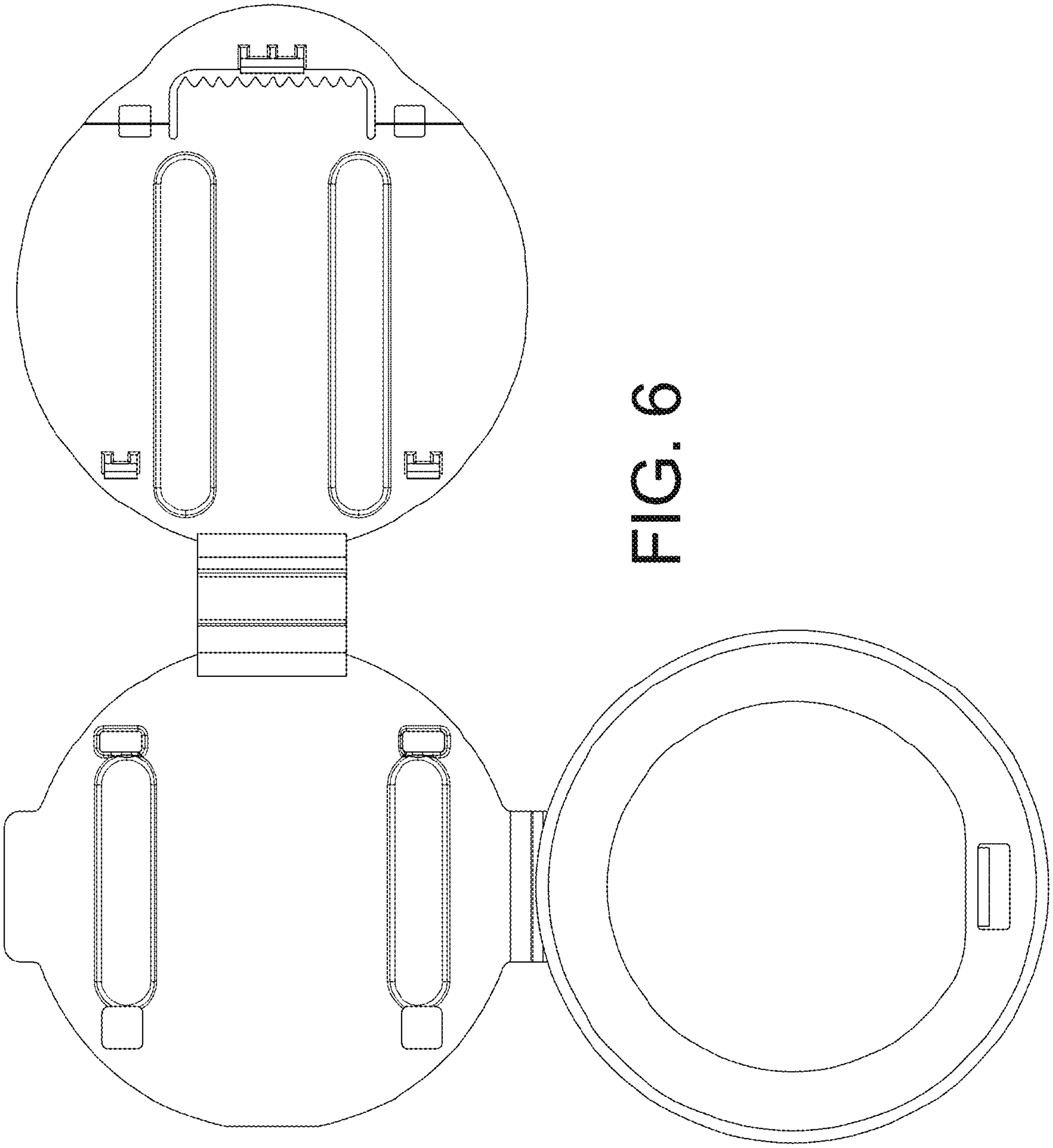
FIG. 6—Bottom plan view of the lid 2000 in an open configuration of the cover plate and open configuration of the cleaning plate.

FIG. 5 is a bottom perspective view of the cover plate in an open confirmation and cleaning plate in an open configuration. FIG. 6 is a bottom plan view of the lid 2000 in an open configuration of the cover plate 2200 and open configuration of the cleaning plate 2300. These figures illustrate the underside of the cleaning plate 2300 including the latches 2320 and inner ovular projections 2330, the upper surface of the cover plate 2200 including the catches 2230 and outer ovular projections 2240, and the undercarriage of the base 2100 for coupling the base 2100 to the upper rim 1100 (not shown-see FIG. 1) of the container 1000 (not shown see FIG. 1).

FIGS. 3-6 suitably shows that the cover plate to cleaning plate hinge 2250 is located 90 degrees away from the cover plate to base hinge 2150 when taken from a radial position around the circular disk of the cover plate 2200. Suitably, this arrangement of the lid at 90-degree intervals around the cover plate 2200 ensures that the tabs 2260 and 2312 do not conflict with each other. The hinge position allows the cleaning plate and cover plates to hinge in transverse directions. Although depicted at 90 degrees in the preferred embodiment, the hinges can be offset radial by any oblique angle without conflicting with each other during operation.

The lid's 2000 unique layout, featuring a dual-hinged lid, annular base, cover plate, and cleaning plate, offers an all-in-one solution for knife sanitation. Its innovative features and portability make it a convenient and effective tool for chefs and home cooks to maintain a hygienic and safe cooking environment. The apparatus's compatibility with various packaging styles, as represented in the reference numerals and components, further emphasizes its versatility and potential in the culinary industry.

Figure 7B:
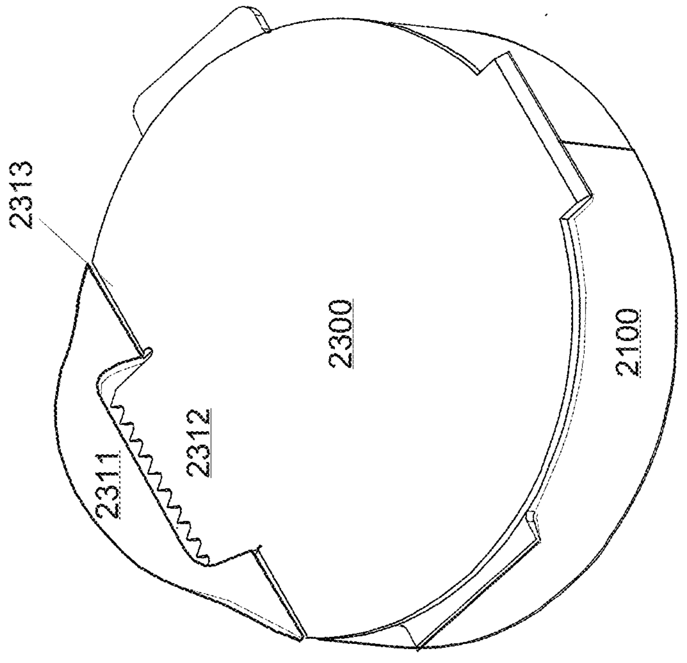
FIG. 7B—Another perspective view of the wipes' container 1000 with the straightedge-cleaning lid 2000 in a closed configuration relative to the base.
Figure 7A:
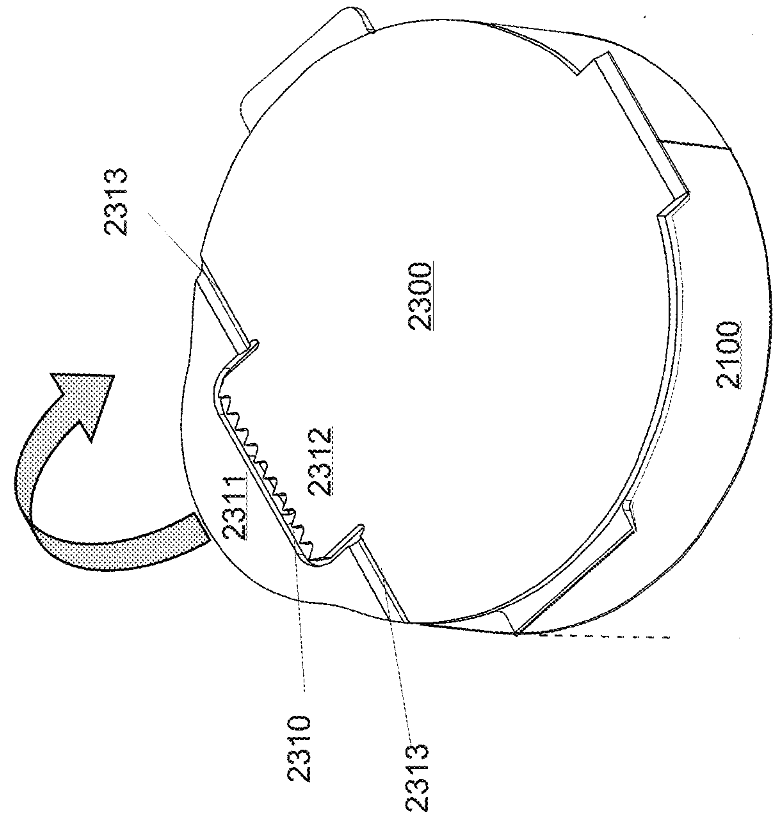
FIG. 7A—Another perspective view of the wipes' container 1000 with the straightedge-cleaning lid 2000 in a closed configuration relative to the base.

FIGS. 7A & 7B present another perspective view of the lid 2000. The figures showcase the straightedge-cleaning lid 2000 in a closed configuration relative to the base 1000. Meanwhile, FIGS. 7C & 7D offer another perspective of a container, featuring the straightedge-cleaning lid 2000 in an open configuration relative to the cover plate 2200. In these views, the top surface of the cover plate 2200 is exposed, as is the cleaning plate's bottom surface, allowing users easy access to the wipes and cleaning plate for knife sanitation. FIGS. 7A through 7D illustrate operation of the mouth 2310 of the cleaning plate 2300. It should be noted that the tab 2311 has a latch 2314 that interacts with cover plate's 2200 catch edge 2270 to keep the mouth closed when the lid is in a closed state 2330.

Figure 7D:
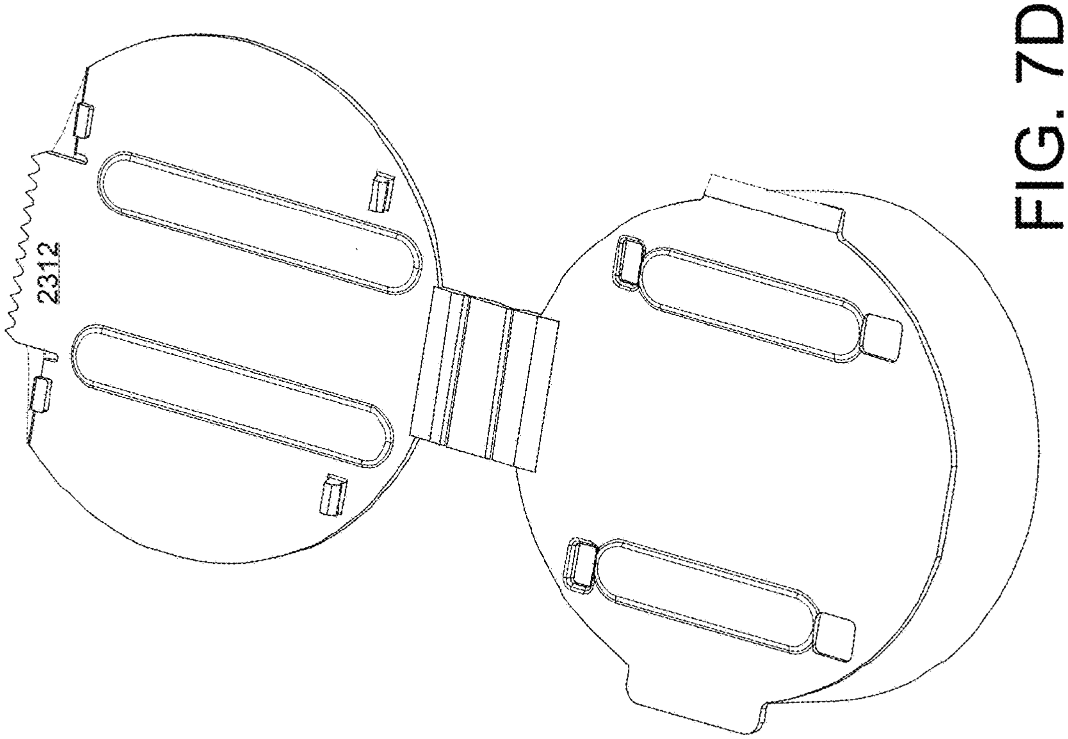
FIG. 7D—Another perspective view of the wipes' container 1000 with the straightedge-cleaning lid 2000 in an open configuration relative to the cover plate 2200.
Figure 7C:
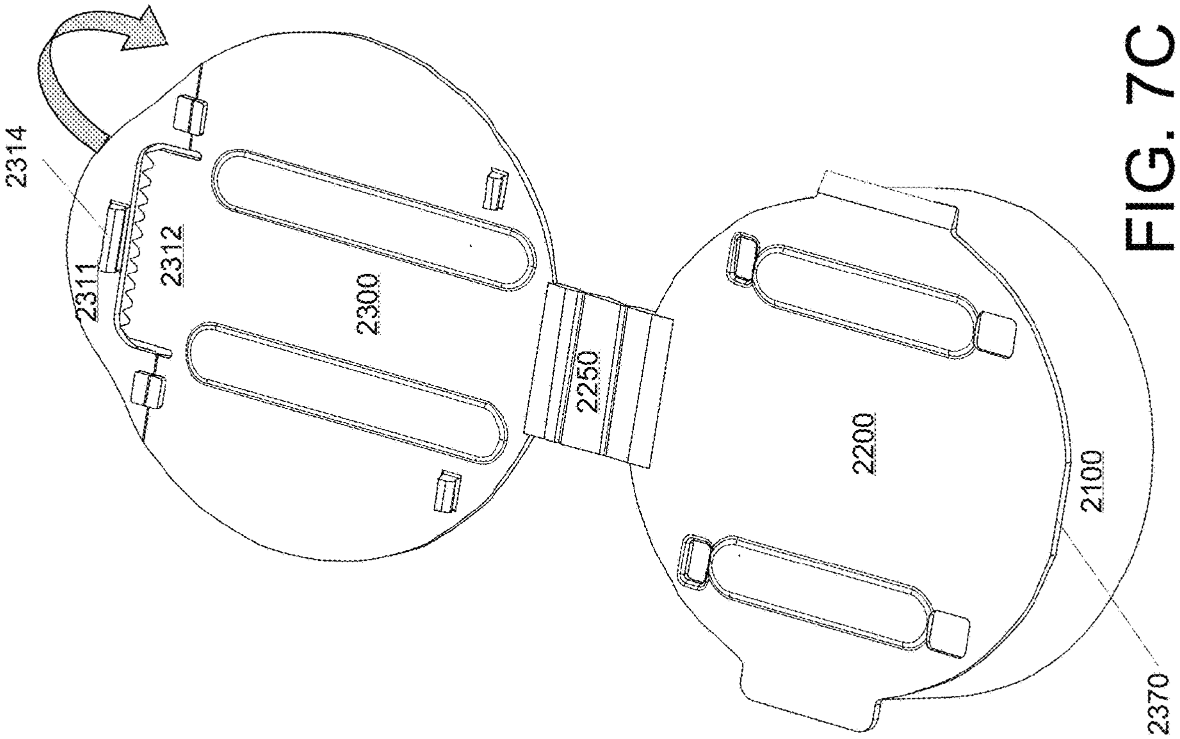
FIG. 7C—Another perspective view of the wipes' container 1000 with the straightedge-cleaning lid 2000 in an open configuration relative to the cover plate 2200.

In FIGS. 7A & 7C, the cleaning plate's mouth 2310 is in a closed position, with the tab 2312 and teeth 2311 approximately aligned on the same plane as the cleaning plate 2300. This configuration ensures that the mouth 2310 remains shut. FIGS. 7B & 7D depict the tab 2312 hinged relative to the teeth 2311, allowing the mouth 2310 to open. This operation of a hinge 2313 facilitates attachment of the wipes 3000 to the cleaning plate 2300 so that knives or straightedges can be cleaned.

Figure 8A:
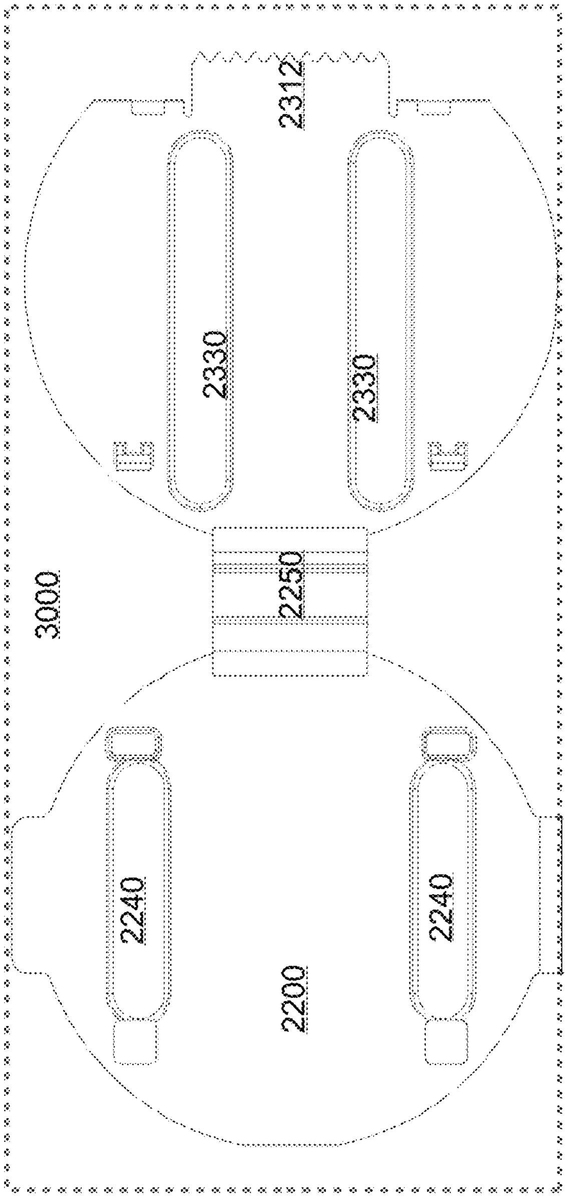
FIG. 8A—Plan view of the lid 2000 in an open configuration relative to the cover plate, showing the cleaning plate mouth open.
Figure 8B:
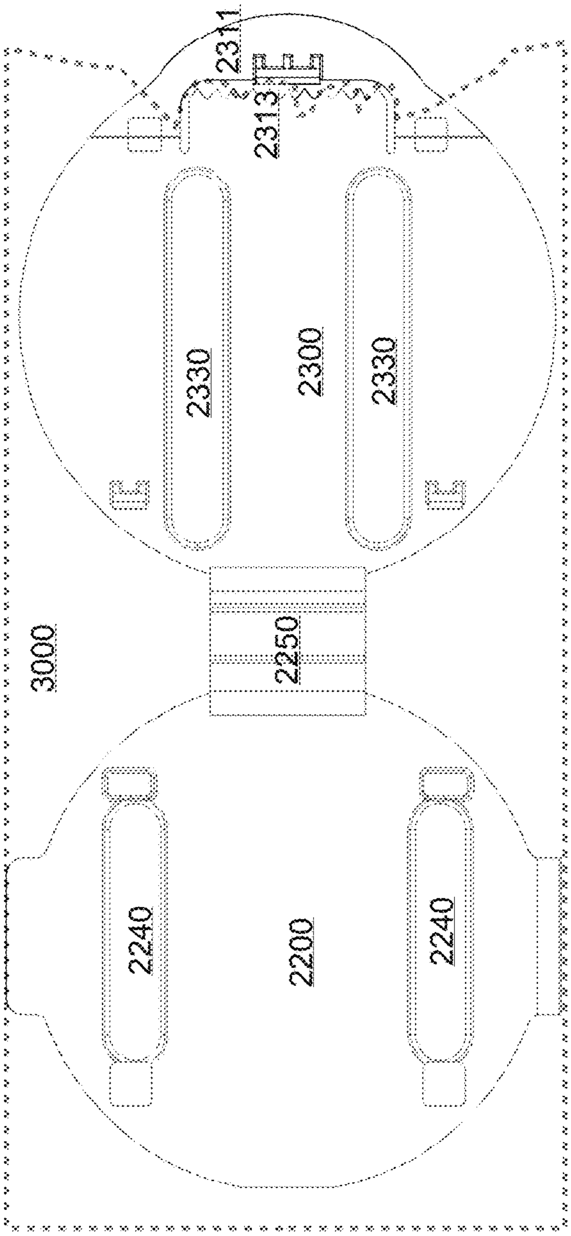
FIG. 8B—Plan view of the lid 2000 in an open configuration relative to the cover plate, showing the cleaning plate mouth closed.

FIGS. 8A & 8B illustrate operation of the cleaning plate mouth prior to straightedge cleaning. In FIG. 8A, the lid 2000 is in an open configuration relative to the cover plate 2200. In this state, the cleaning plate's mouth 2310 is also open, exposing the teeth 2313 for use. Prior to cleaning a straightedge, a wipe 3000 is preferably placed over the upper surface of the cover plate 2200, extending to the underside of the cleaning plate where the mouth 2310 is open. The teeth 2313 are exposed, providing a gripping surface for securely holding the wipe in place in that situation. FIG. 9B illustrates the cleaning plate 2300 mouth 2310 being closed with the wipe 3000 securely held in its situation. In FIG. 9B, the cleaning plate's mouth 2310 is closed, with the teeth 2313 and tab 2312 securely gripping and holding the wipe 3000 in place in its spread-out orientation. This configuration ensures that the wipe remains in position during the cleaning process. The ability to securely hold wipes during use enhances the overall convenience and effectiveness of the technology in professional and home kitchen settings.

Figure 9:
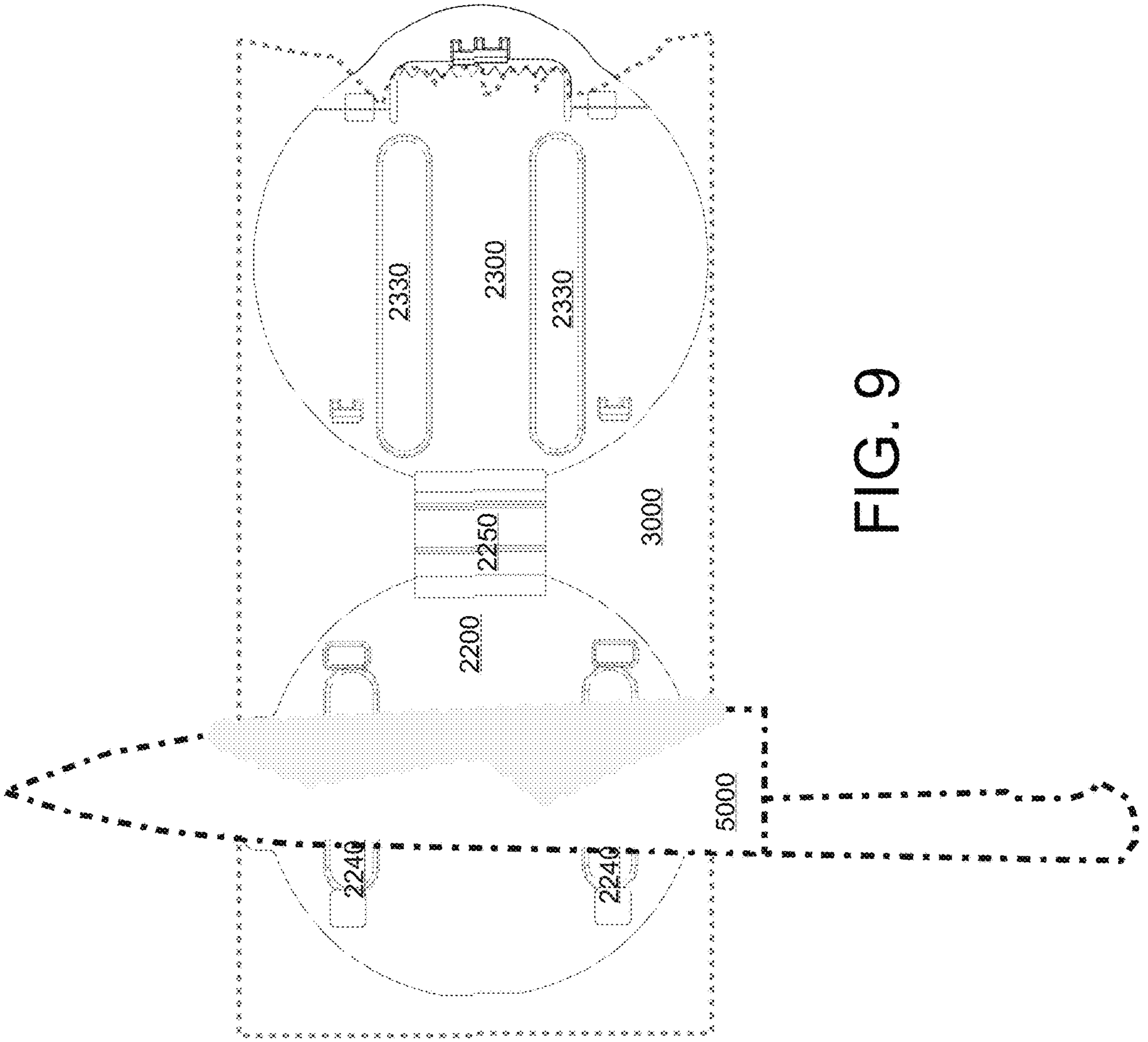
FIG. 9—Illustration of wiping the knife or straightedge 5000 on the cover and cleaning plates.
Figure 10A:
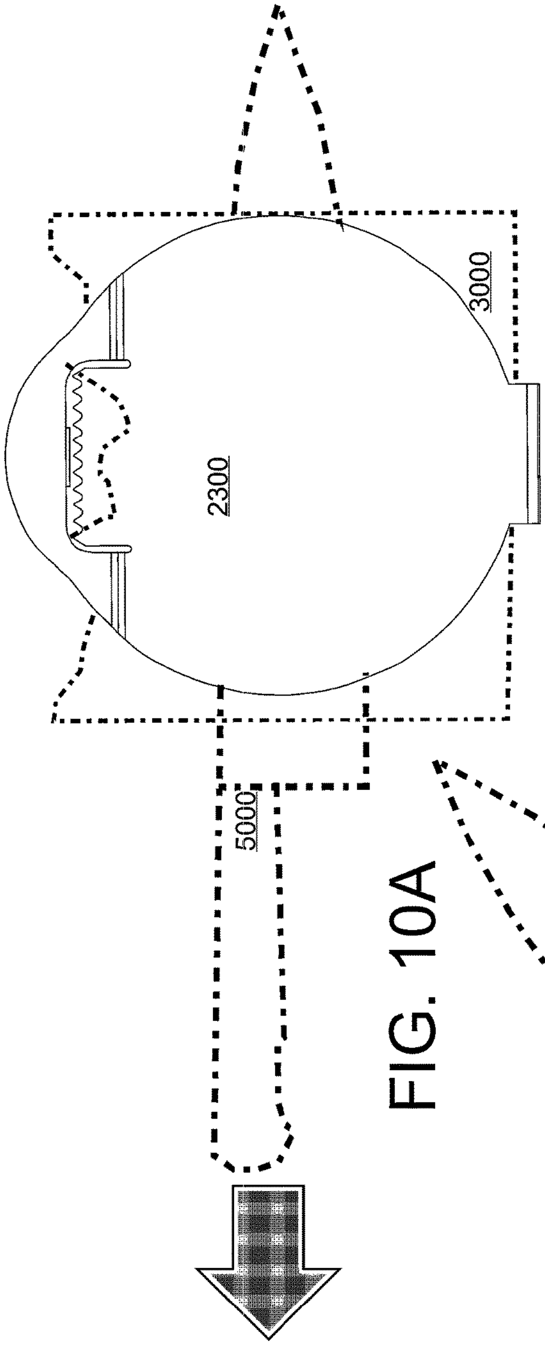
FIG. 10A—Illustration of cleaning the knife or straightedge 5000 between the cover and cleaning plates, with the wipe 3000 folded over the knife.
Figure 10B:
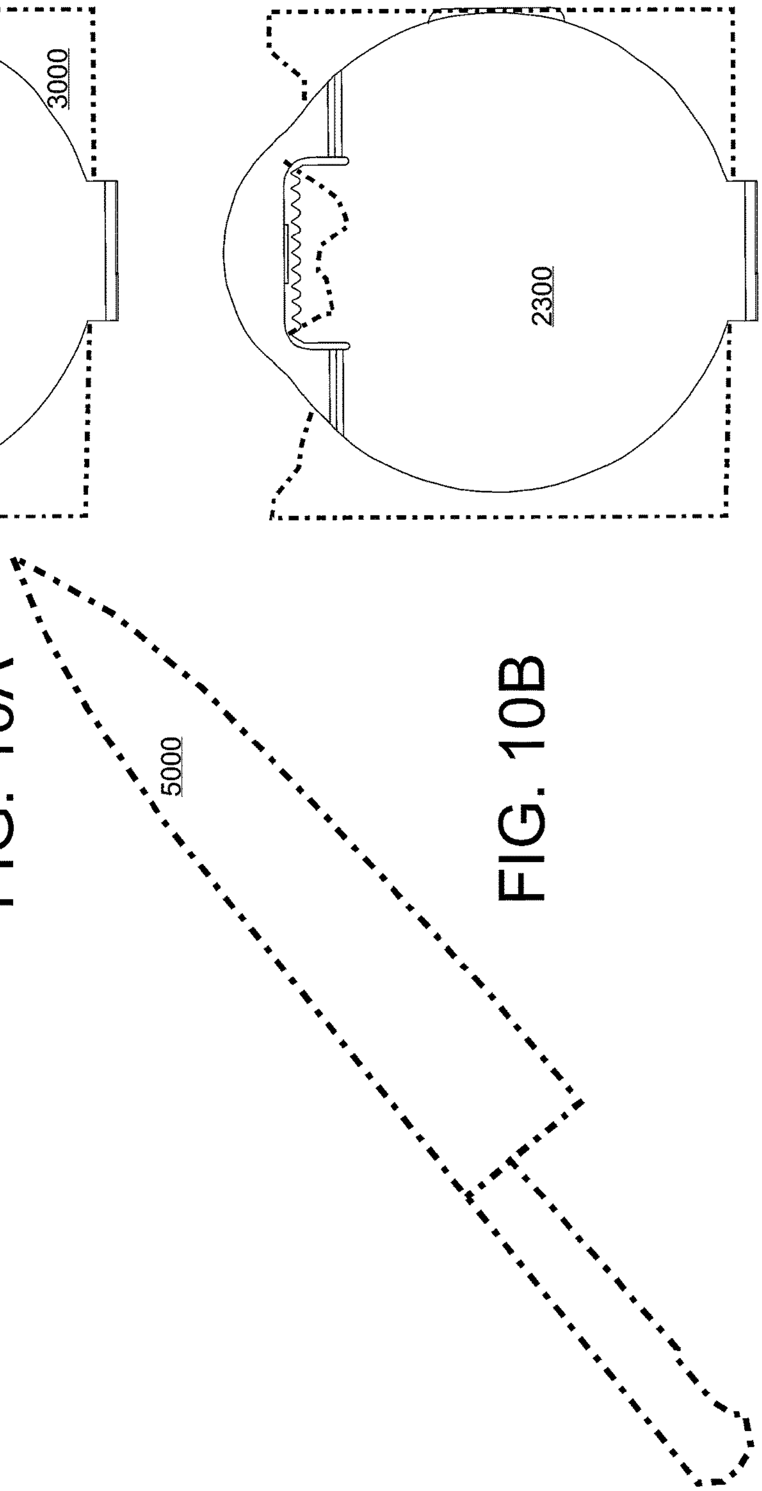
FIG. 10B—Illustration of cleaning the knife or straightedge 5000 between the cover and cleaning plates, with the waste wiped off contained within the wipe.

FIGS. 9, 10A & 10B illustrate cleaning a knife or straightedge via the cleaning and cover plates. As shown in FIG. 9, a knife or straight edge 5000 is positioned on the cover plate 2200 such that the knife extends across the cover plate and such that the knife or straightedge spans the outer ovular projections. As shown in FIG. 10A, the cleaning plate may be closed relative to the cover plate such that the knife or straight edge is sandwiched between the two plates and the wipe 3000 is folded over the knife or straight edge. Both the inner and outer ovular projections on the cover plate and cleaning plate, respectively, are composed of rubber or other malleable materials. This smart design choice allows the projections to adapt to the slanted surfaces of the knife or straight edge, forming a seamless wiping interface and ensuring comprehensive sanitation. As shown in FIGS. 10A and 10B the knife may be pulled from the sandwiched configuration such that the food stuff or waste on the knife edge is wiped off to within the wipe. Through this innovative knife sanitation process, the lid seemingly guarantees a pristine and hygienic blade for the next use. The integration of the cleaning and cover plates ensures an all-in-one solution, combining the convenience of wipes with a secure mechanism to efficiently sanitize knives or straight edges.

In use, the device has the following method:

Step 1—Refer to FIG. 1A and see the step of opening the straightedge-cleaning lid 2000 by lifting the cover plate 2200 away from the annular base 2100 using the tab 2260. The latch 2220 disengages from the corresponding catch on the rim of the annular base.

Step 2—refer to FIG. 8A and see the step of laying out a sanitation wipe 3000 over the upper surface of the cover plate 2200 and the underside of the cleaning plate 2300, with the cleaning plate mouth 2310 open and the teeth 2313 exposed.

Step 3—referring to FIG. 8B, step 3 is biting the wipe via closing the cleaning plate mouth 2310 by hinging the tab 2312 relative to the teeth 2311 such that the wipe 3000 is secured with the teeth 2311 of the cleaning plate 2300.

Step 4—Refer to FIG. 9 to see the step of carefully placing the knife or straight edge 5000 on the cover plate 2200 so that the blade 5000 extends across the cover plate 2200 and spans the outer ovular projections 2240.

Step 5—Refer to FIG. 10A to see that, with the wipe 3000 secured in the cleaning plate's mouth 2310, the step of closing the cleaning plate 2300 relative to the cover plate 2200 is accomplished such that the wipe 3000 is neatly folded over the knife, creating a secure "sandwich" with the knife 5000 safely held between the two plates.

Step 6—step 6 is wiping off residue (Refer to FIGS. 10A & 10B) via gently pulling the knife 5000 from the sandwiched configuration such that the inner and outer ovular projections adapt to the slanted surfaces of the knife or straight edge, effectively wiping off any food residue or waste from the knife's edge onto the wipe 3000.

Step 7—Refer to FIGS. 7A & 7B to see the step of the knife or straight edge 5000 being sanitized.

Figure 11:
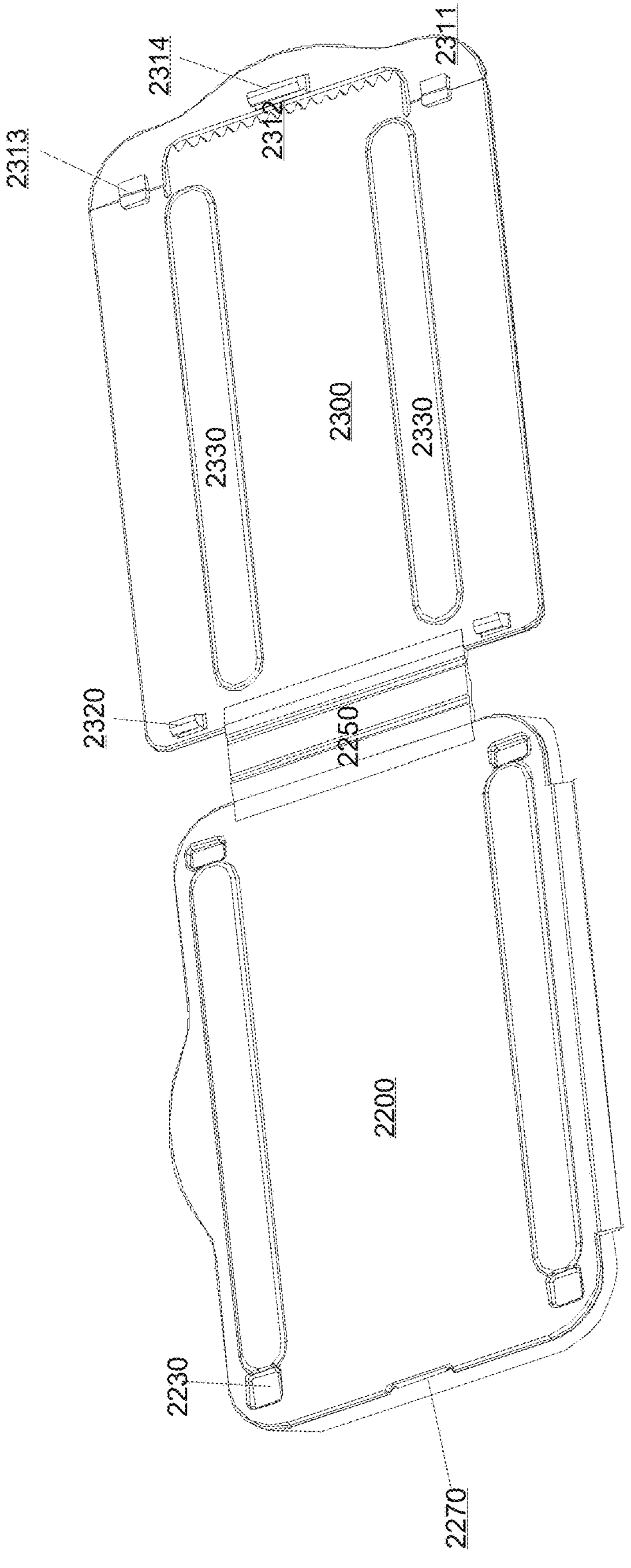
FIG. 11—Alternative embodiment of the knife or straightedge cleaning lid 2000 in a rectangular shape.
Figure 12:
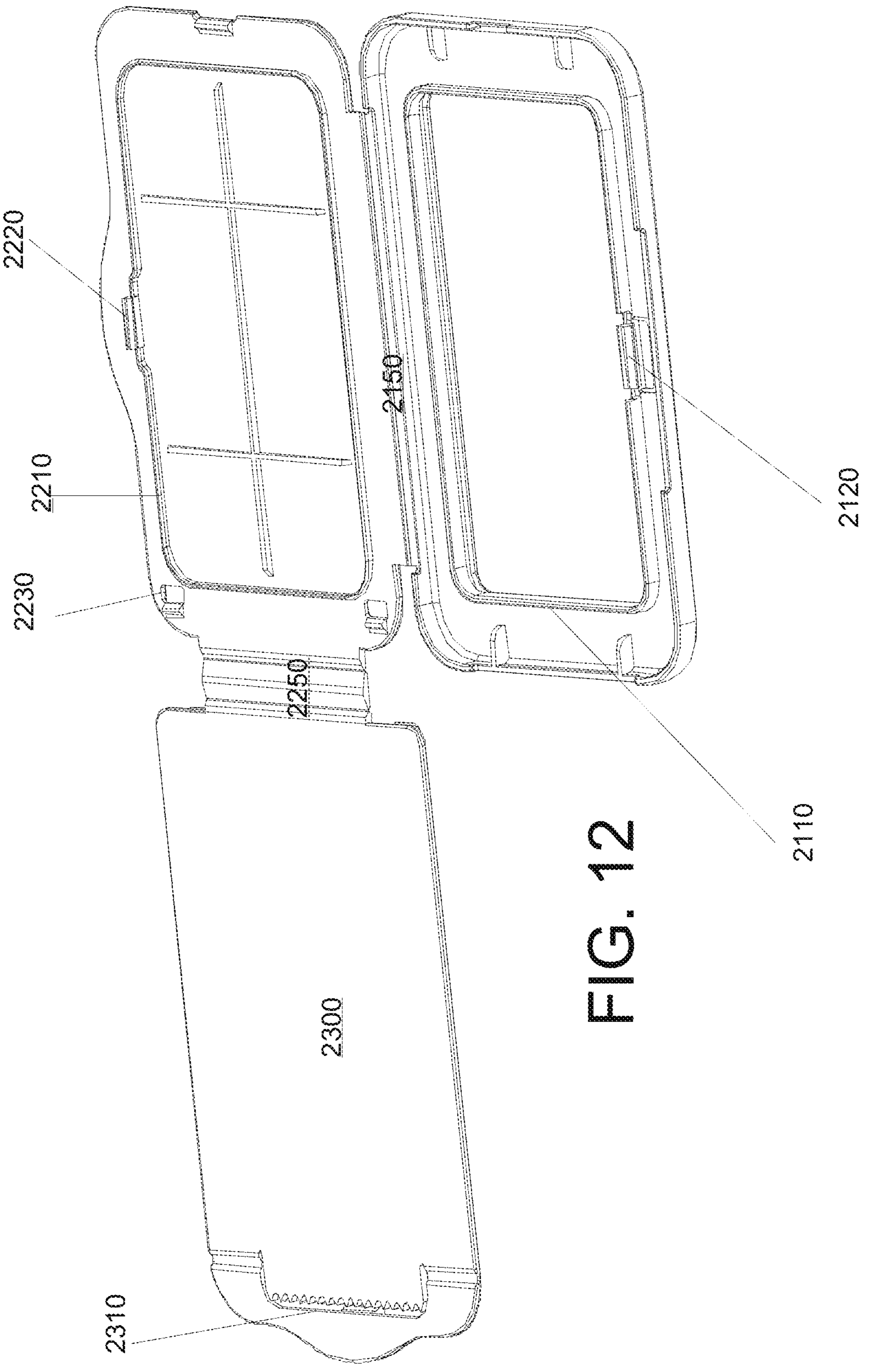
FIG. 12—Top perspective view of the alternative embodiment of the lid 2000 in an open configuration of the cover plate and open configuration of the cleaning plate.
Figure 13:
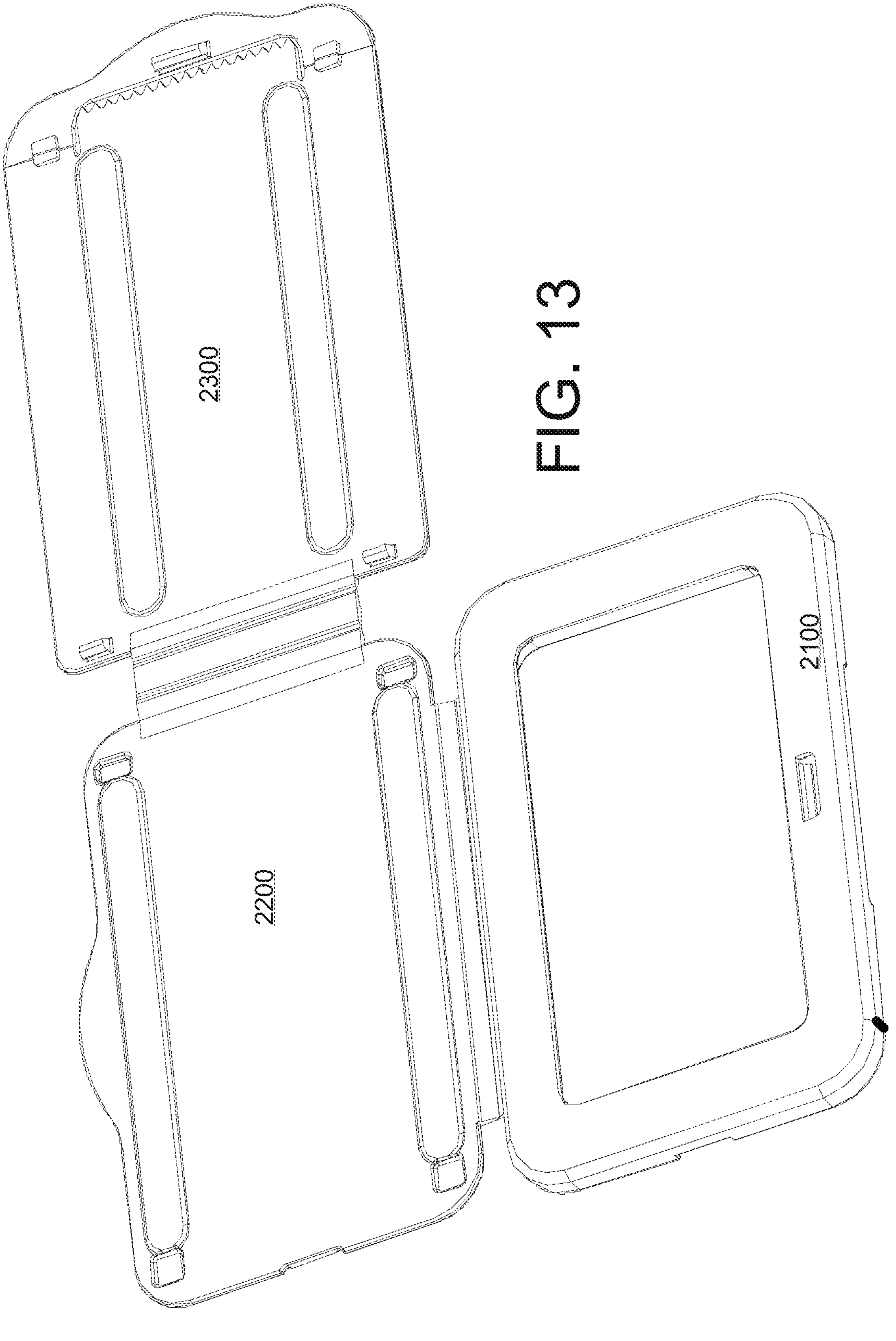
FIG. 13—Bottom perspective view of the alternative embodiment of the lid 2000 in an open configuration of the cover plate and open configuration of the cleaning plate.
Figure 16:
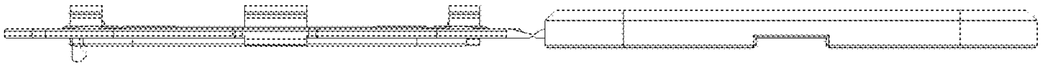
FIG. 16—Front view of the alternative embodiment of the lid depicted in FIG. 15.
Figure 14:
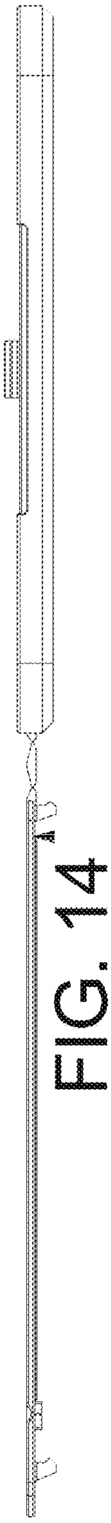
FIG. 14—Side view of the alternative embodiment of the lid depicted in FIG. 13.
Figure 15:
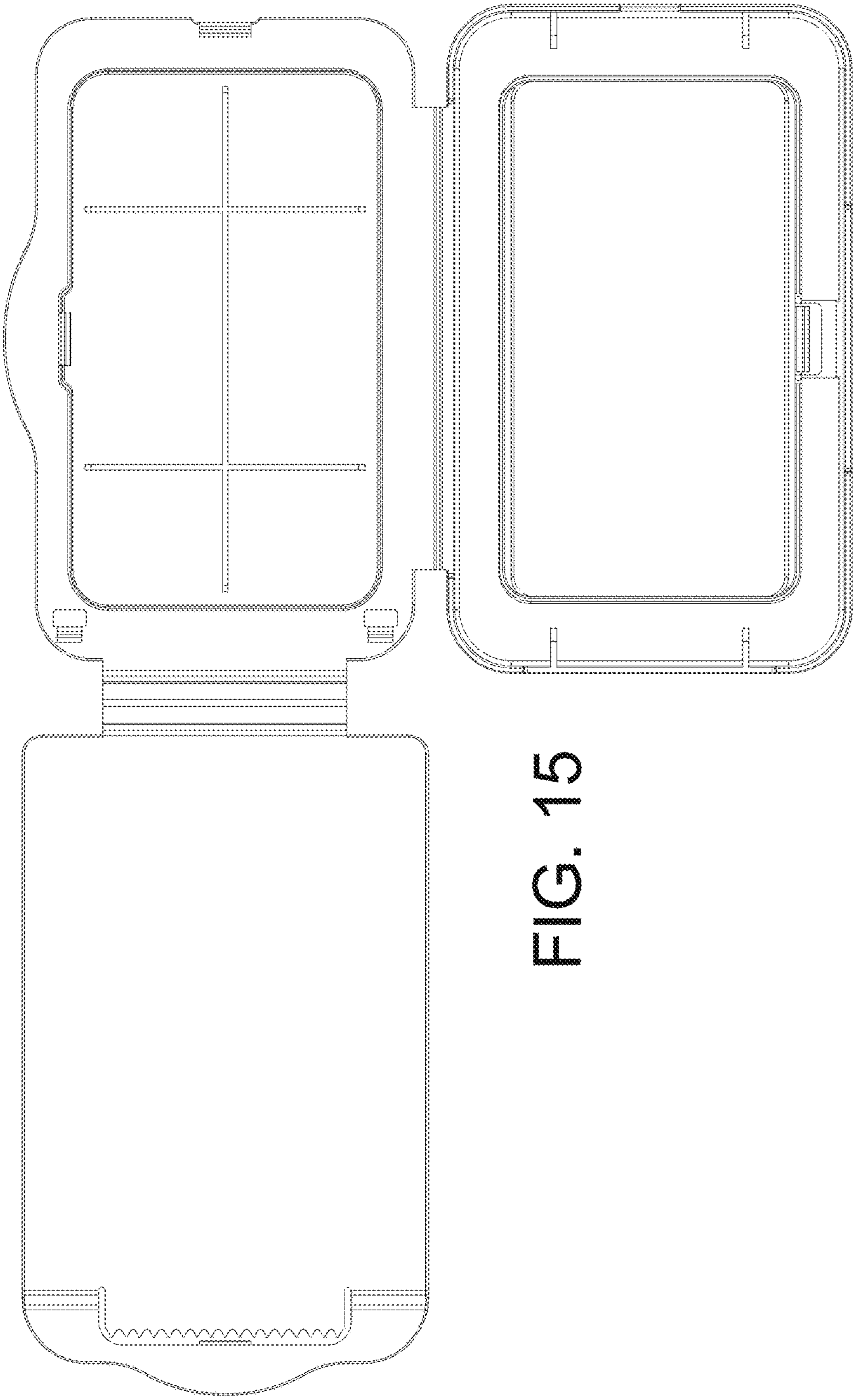
FIG. 15—Plan view of the alternative embodiment of the lid depicted in FIG. 12.

The disclosed straightedge-cleaning lid 2000 has a utility that is a versatile solution for knife sanitation, ensuring safety and hygiene during culinary tasks. The lid 200 can be readily adapted and used with different wipes packaging options, offering a portable and efficient apparatus for all-in-one knife sanitation needs. For instance, FIG. 11 is an alternative embodiment of the knife or straightedge cleaning lid 2000 that can be used on a pouch or packet of wipes. See, e.g., U.S. Pat. No. 10,334,998 (issued Jul. 2, 2019) by Rubo et al. (incorporated by reference). The lid 2000 of FIG. 11 has all the same components as the lid 2000 shown in FIGS. 1 through 10B. However, the lid in FIG. 11 is rectangular. FIG. 12 is a top perspective view of the lid 2000 of FIG. 11 and shows the top of the cleaning plate 2300, the bottom of the cover plate 2200, and the upper side of the base 2100. FIG. 13 is a bottom perspective of the lid 2000 and shows the underside of the cleaning plate 2300, the top side of the cover plate 2200, and the undercarriage of the base 2100. FIG. 14 is a side view of the lid 2000 depicted in FIG. 13. FIG. 15 is a plan view of the Lid 2000 depicted in FIG. 12. FIG. 16 is a front view of the lid 2000 depicted in FIG. 15.

Although the method and apparatus is described above in terms of various exemplary embodiments and implementations, it should be understood that the various features, aspects, and functionality described in one or more of the individual embodiments are not limited in their applicability to the particular embodiment with which they are described, but instead might be applied, alone or in various combinations, to one or more of the other embodiments of the disclosed method and apparatus, whether or not such embodiments are described and whether or not such features are presented as being a part of a described embodiment. For example, the disclosed lid may be adapted for use in any of the packing identified in the following documents:

U.S. Pat. No. 3,982,659 (issued 1976 Sep. 28) by Ross discloses a "bulk package for substantially wet sheets and dispensing devices therefor."

U.S. Pat. No. 4,185,754 (issued 1980 Jan. 29) by Jilius discloses a "collapsible recloseable dispenser packet with two-part resealable closure."

U.S. Pat. No. 5,040,680 (issued 1991 Aug. 20) by Wilson et al. discloses a "dispensing container."

U.S. Pat. No. 5,699,912 (issued 1997 Dec. 23) by Ishikawa et al. discloses a "container for wetted tissues."

U.S. Pat. No. 6,092,690 (issued 2000 Jul. 25) by Bitowft et al. discloses a "wet-wipe container having a hinged cover."

U.S. Pat. No. 6,394,298 (issued 2002 May 28) by Zaidman discloses a "dispensing cover."

U.S. Pat. No. 6,951,292 (issued 2005 Oct. 4) by Bando et al. discloses a "container with hinged lid."

U.S. Pat. No. 8,893,911 (issued 2014 Nov. 25) by Damaghi et al. discloses a "dispenser lid and container including the same."

U.S. patent Ser. No. 10/334,998 (issued 2019 Jul. 2) by Rubo et al. discloses a "flexible container and reusable closure element."

U.S. Des. Pat. No. D414637 (issued 1999 Oct. 5) by Amundson et al. discloses a "container for wipes."

U.S. Des. Pat. No. D545097 (issued 2007 Jun. 26) by Schlaupitz et al. discloses a "container for wipes."

U.S. Des. Pat. No. D967706 (issued 2022 Oct. 25) by Dern et al. discloses a "container lid."

U.S. Pub. App. No. US 20060054517 (published 2006 Mar. 16) by Albert discloses a "wipe storage system." See front page:

U.S. Pub. App. No. US 20080099596 (published 2008 May 1) by DeMaso et al. discloses "oval wipes. container."

U.S. Pub. App. No. US 20050039293 (published 2005 Feb. 24) by McReynolds et al. discloses a "dispenser assembly for dispensing liquid onto a removable sheet contained by an implement."

U.S. Pub. App. No. US 20080179326 (published 2008 Jul. 31) by Krauth et al. discloses a "push button dispensing lid."

Thus, the breadth and scope of the claimed invention should not be limited by any of the above-described embodiments.

Terms and phrases used in this document, and variations thereof, unless otherwise expressly stated, should be construed as open-ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more," or the like; and adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that might be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to," or other like phrases in some instances shall not be read to mean that the narrower case is intended or required in instances where such broadening phrases might be absent. The use of the term "assembly" does not imply that the components or functionality described or claimed as part of the module are all configured in a common package. Indeed, any or all the various components of a module, whether control logic or other components, might be combined in a single package or separately maintained and might further be distributed across multiple locations.

Additionally, the various embodiments set forth herein are described in terms of exemplary block diagrams, flow charts, and other illustrations. As will become apparent to one of ordinary skill in the art after reading this document, the illustrated embodiments and their various alternatives might be implemented without confinement to the illustrated examples. For example, block diagrams and their accompanying description should not be construed as mandating a particular architecture or configuration.

All original claims submitted with this specification are incorporated by reference in their entirety as if fully set forth herein.

I claim:

1. A method of knife or straight edge sanitation comprising:

opening a lid by lifting a cover plate away from an annular base using a tab of the cover plate;

pulling a sanitation wipe through an annulus of the annular base;

laying out the sanitation wipe over the upper surface of the cover plate and the underside of a cleaning plate;

opening a mouth of the cleaning plate to expose at least one tooth of the cleaning plate;

securing the wipe by closing the cleaning plate's mouth;

placing a knife or straight edge on the cover plate such that the blade spans outer ovular projections of the cover plate;

closing the cleaning plate relative to the cover plate such that knife is held between said cleaning and cover plates and such that the knife interfaces said outer ovular projections and at least one inner ovular projection of the cleaning plate;

pulling the knife out from between the cleaning and cover plates;

opening the mouth of the cleaning plate;

discarding the wipe with food residue or waste of the knife disposed within the wipe.

2. The method of claim 1 further comprising the step of disengaging a latch of the cover plate from a corresponding catch on the rim of the annular base.

3. The method of claim 2 wherein the step of securing the wipe by closing the cleaning plate's mouth is accomplished via hinging a tab of the cleaning plate relative to the at least one tooth of the cleaning plate.

4. The method of claim 3 wherein the step of closing the cleaning plate relative to the cover plate accomplishes a further step of folding the wipe over the knife.

5. The method of claim 4 wherein the step of closing the cleaning plate relative to the cover plate precedes a further step of allowing the inner and outer ovular projections to adapt to slanted surfaces of the knife or straight edge.

6. The method of claim 5 wherein the step of pulling the knife out from between the cleaning and cover plates accomplishes the further step of wiping off food residue or waste from the blade onto the wipe, and sanitizing the knife or straight edge using cleaning and sanitization solution in the wipes.

7. The method of claim 6 wherein the step of pulling the knife out from between the cleaning and cover plates accomplishes the further step of protecting at least one finger from the blade of the knife.

8. The method of claim 7 wherein the step of protecting at least one finger from the blade of the knife is accomplished via holding the finger against the upper surface of the cleaning plate.

9. The method of claim 1 where the base is annular.

10. The method of claim 1 where the base is rectangular.

11. An apparatus for knife or straight edge sanitation, comprising:

a container with an annular base (2100) and a cover plate (2200) hingedly connected to the annular base;

a cleaning plate (2300) hingedly connected to the cover plate;

a tab (2260) on the cover plate for lifting and opening the lid;

an annulus through the annular base for dispensing a sanitation wipe;

a mouth (2310) on the cleaning plate with at least one tooth (2311) for securing a sanitation wipe;

outer ovular projections (2240) on the cover plate for supporting the knife or straight edge;

inner ovular projections on the cleaning plate for abutting the knife or straight edge through a sanitation wipe when the mouth secures the sanitation wipe and when the cleaning plate is closed relative to the cover plate;

wherein the inner and outer ovular projections are constructed of malleable material for adapting the inner and outer ovular projections to slanted surfaces of the knife or straight edge through the sanitation wipe when the mouth secures the sanitation wipe and when the cleaning plate is closed relative to the cover plate;

wherein pulling the knife or straight edge out from between the cleaning and cover plates when the mouth secures the sanitation wipe and when the cleaning plate is closed relative to the cover plate results in contaminants on the knife or straight edge being retained on the wipe.

12. The apparatus of claim 11 wherein a user's finger may apply further pressure against an upper surface of the cleaning plate to protect the finger from a knife.

13. A package or container of wipes, said package comprising:

a cover plate attached to the package or container of wipes;

a cleaning plate hingedly connected to the cover plate such that a surface of the cleaning plate and a surface of the cover plate are adjacent to one another when the cleaning plate and cover plate are set in a closed configuration;

where a wipe from the container of wipes is folded and disposed between the cleaning plate and the cover plate in a closed configuration; and, wherein a knife or straight edge may be disposed within a fold of the folded wipe disposed between the cleaning plate and the cover plate in the closed configuration.

14. The package or container of wipes of claim 13 wherein food contaminants from the knife are disposed within the fold of the folded wipe disposed between the cleaning plate and the cover plate in the closed configuration.

15. The lid of claim 14 wherein a user's finger may apply further pressure against a top surface of the cleaning plate.

16. The lid of claim 13 wherein a latch of the cover plate is coupled to a catch of the base.

17. The lid of claim 13 further comprising a base that is annular.

18. The lid of claim 13 further comprising a base that is rectangular.

* * * * *